US011171913B2

(12) United States Patent
Beedu et al.

(10) Patent No.: US 11,171,913 B2
(45) Date of Patent: Nov. 9, 2021

(54) SYSTEMS AND METHODS FOR IMPLEMENTING ADDRESS TRANSLATION SERVICES

(71) Applicant: Nutanix, Inc., San Jose, CA (US)

(72) Inventors: Bharat Kumar Beedu, Bangalore (IN); Arun Olappamanna Vasudevan, Seattle, WA (US); Sasthakumar Ramamurthy, Milpitas, CA (US); Parthasarathy Ramachandran, Palo Alto, CA (US); Saikat Roychowdhury, Issaquah, WA (US); Ganesh Sahukari, Kasibugga (IN)

(73) Assignee: Nutanix, Inc., San Jose, CA (US)

( * ) Notice: Subject to any disclaimer, the term of this patent is extended or adjusted under 35 U.S.C. 154(b) by 63 days.

(21) Appl. No.: 16/147,184

(22) Filed: Sep. 28, 2018

(65) Prior Publication Data
US 2020/0106737 A1   Apr. 2, 2020

(51) Int. Cl.
*G06F 15/16*   (2006.01)
*H04L 29/12*   (2006.01)
*G06F 15/173*   (2006.01)

(52) U.S. Cl.
CPC ........ *H04L 61/106* (2013.01); *H04L 61/6004* (2013.01)

(58) Field of Classification Search
CPC ... H04L 67/10; H04L 67/306; H04L 12/4641; H04L 51/32; H04L 12/4633; H04L 41/16; H04L 43/08
USPC ........................................ 709/221, 224, 217
See application file for complete search history.

(56) References Cited

U.S. PATENT DOCUMENTS

| 8,549,518 | B1 | 10/2013 | Aron et al. |
| 8,601,473 | B1 | 12/2013 | Aron et al. |
| 8,850,130 | B1 | 9/2014 | Aron et al. |
| 8,942,235 | B1* | 1/2015 | Vinapamula Venkata ........... H04L 63/02 370/254 |
| 8,997,097 | B1 | 3/2015 | Aron et al. |
| 9,052,936 | B1 | 6/2015 | Aron et al. |
| 9,256,374 | B1 | 2/2016 | Aron et al. |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Karen C Tang
(74) *Attorney, Agent, or Firm* — Vista IP Law Group, LLP

(57) ABSTRACT

Methods, system, and computer program product for implementing an address translation service that uses nondenominational address handles instead of IP addresses between private cloud domain and public cloud domains. The address translation service can be implemented to enable a data-center running in a private cloud domain to communicate with the public cloud domain data-center over load balancers. In addition, the address translation service ensures that all services that need to communicate across data-centers can be reached over load balancers. As such, to avoid conflicting subnets used by a data center from the private cloud domain and the public cloud domain, services in the public cloud domain use a private cloud load balancer to connect with the services in a private cloud domain. Similarly, a public cloud load balancer is used to connect with services in the private cloud domain.

26 Claims, 24 Drawing Sheets

(56) References Cited

U.S. PATENT DOCUMENTS

| | | | |
|---|---|---|---|
| 9,256,475 B1 | 2/2016 | Aron et al. | |
| 9,354,912 B1 | 5/2016 | Aron et al. | |
| 9,389,887 B1 | 7/2016 | Aron et al. | |
| 9,575,784 B1 | 2/2017 | Aron et al. | |
| 9,619,257 B1 | 4/2017 | Aron et al. | |
| 9,642,167 B1* | 5/2017 | Snyder | H04W 4/021 |
| 9,772,866 B1 | 9/2017 | Aron et al. | |
| 9,832,118 B1* | 11/2017 | Miller | H04L 45/74 |
| 10,298,720 B1* | 5/2019 | Miller | H04L 67/141 |
| 2013/0067090 A1* | 3/2013 | Batrouni | H04L 67/1097 |
| | | | 709/226 |
| 2013/0291123 A1* | 10/2013 | Rajkumar | H04L 63/0407 |
| | | | 726/28 |
| 2014/0281031 A1* | 9/2014 | O'Connor | H04L 61/2007 |
| | | | 709/245 |
| 2016/0105488 A1* | 4/2016 | Thakkar | H04L 67/10 |
| | | | 709/217 |
| 2017/0026283 A1* | 1/2017 | Williams | H04L 45/64 |
| 2017/0185437 A1* | 6/2017 | Thomas | G06F 9/45558 |
| 2018/0234471 A1* | 8/2018 | Qian | H04N 7/15 |
| 2019/0104413 A1* | 4/2019 | Cidon | H04W 12/08 |
| 2019/0273681 A1* | 9/2019 | Williams | H04L 45/586 |
| 2019/0364099 A1* | 11/2019 | Thakkar | H04L 43/10 |
| 2019/0372908 A1* | 12/2019 | Featonby | H04L 67/1095 |
| 2020/0012637 A1* | 1/2020 | Strauss | G06F 16/182 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Cano, I. et al., "Curator: Self-Managing Storage for Enterprise Clusters", *14th USENIX Symposium on Networked Systems Design and Implementation, NSDI '17*, (Mar. 27, 2017).

* cited by examiner

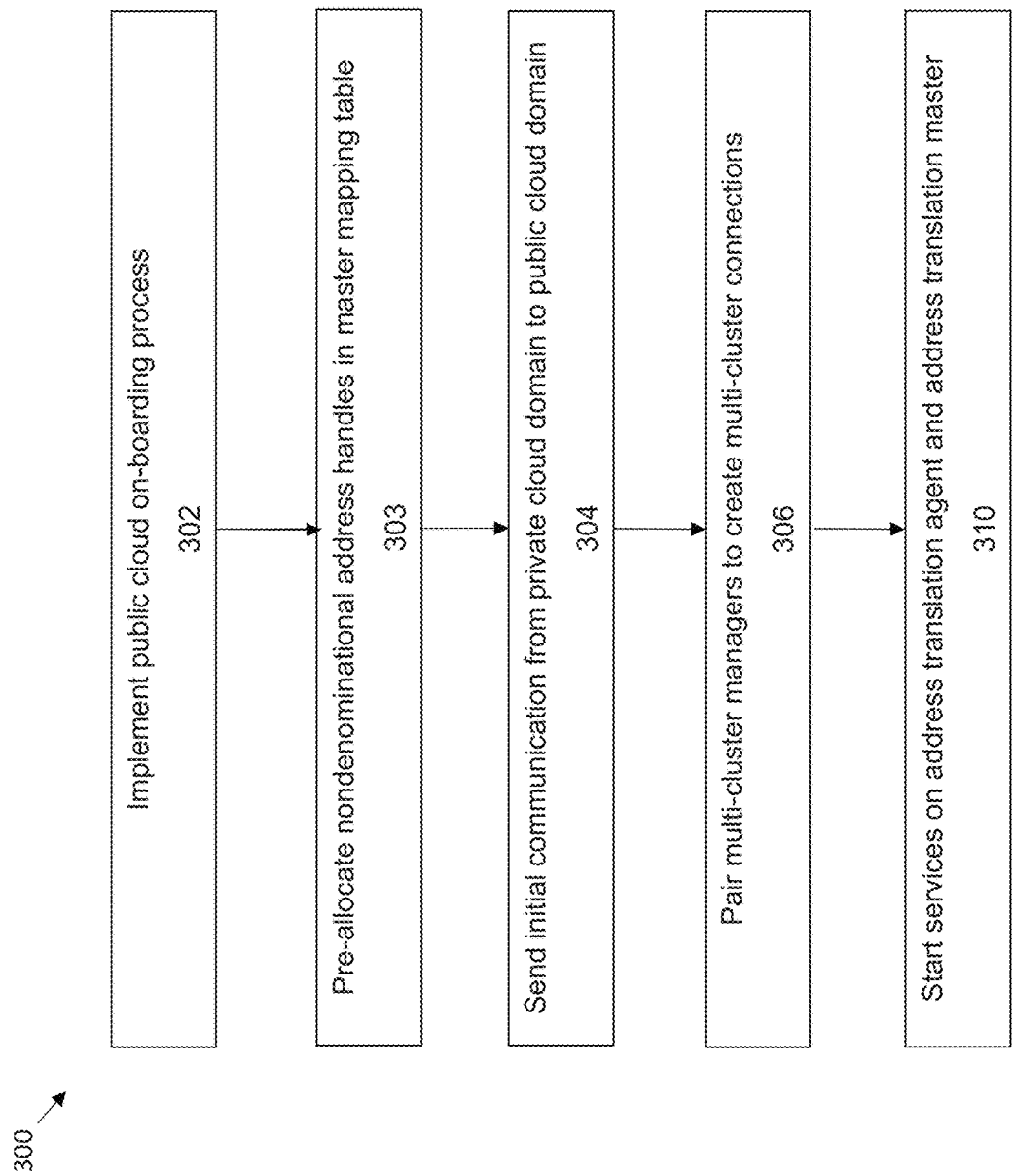

SYSTEMS AND METHODS FOR IMPLEMENTING ADDRESS TRANSLATION SERVICES

FIELD

This disclosure relates to cloud networking and, more particularly to techniques for implementing a service for translating non-denominational address handles between private cloud domains and a public cloud domain.

BACKGROUND

In a multi-cloud era, data and applications can be dispersed, not just across enterprise private and public clouds, but also distributed across private clouds, classic on-premises (On-Prem) data centers, remote office/branch office (ROBO), and disaster recovery (DR) sites, as well as upcoming edge computing sites and public clouds. In particular, a public cloud domain service may be a specific type of integrated public cloud environment that is connected to by multiple on-premise customers on their own private cloud domains. The public cloud domain service contains clusters that are dedicated to each customer.

A customer's private cloud network (e.g., the on-prem data center) and the public cloud network may be in different routing domains and managed independently. As such, when an independent entity is choosing its own IP addresses on his own private cloud networks, this creates the potential for collisions in IP addresses from the private cloud domains and the public cloud domain due to conflicts of subnets in use at either end. The problem is further compounded when environments are made up of multiple independent entities on their own private cloud domains choosing their own IP addresses that connect to the same public cloud domain service. In addition, there is often the desire to not expose IP addresses for the public cloud domain service directly to the private cloud domains for security, management, or logistical reasons. As such, due to lack of coordination between the private and public domains, it is possible that the address ranges for the public cloud domain overlaps with or duplicates at least some of the address ranges used on the private cloud domain. This means that there is no way to guarantee unique IP addresses on both the private cloud domain and corresponding customer clusters on the public cloud domain.

What is needed is a technique or techniques to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for implementing network address translation services between a private cloud domain and a public cloud domain, which techniques advance the relevant technologies to address technological issues with legacy approaches. More specifically, the present disclosure describes techniques used in systems, methods, and in computer program products for implementing network address translation services between a private cloud domain and a public cloud domain to communicate over load balancers. Certain embodiments are directed to technological solutions for implementing network address translation services between a private cloud domain and a public cloud domain to communicate over load balancers, which embodiments advance the relevant technical fields as well as advancing peripheral fields.

The disclosed embodiments modify and improve over legacy approaches. In particular, the herein-disclosed techniques provide technical solutions that address the technical problems attendant to efficiently implementing network address translation services between private cloud domains and a public cloud domain. Such technical solutions relate to improvements in computer functionality. Various applications of the herein-disclosed improvements in computer functionality service to reduce the demand for computer memory, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed computer equipment and constituent devices within the shown environments as described herein and as depicted in the figures provide advances in the technical field of high-performance computing in a computing cluster as well as advances in various technical fields related to hybrid cloud environments.

Further details of aspects, objectives, and advantages of the technological embodiments are described herein and in the following descriptions, drawings and claims.

BRIEF DESCRIPTION OF THE DRAWINGS

The drawings described below are for illustration purposes only. The drawings are not intended to limit the scope of the present disclosure.

FIG. 3 illustrates a flowchart of an approach to set-up network address translation services, as according to some embodiments.

DETAILED DESCRIPTION

Figure 1:
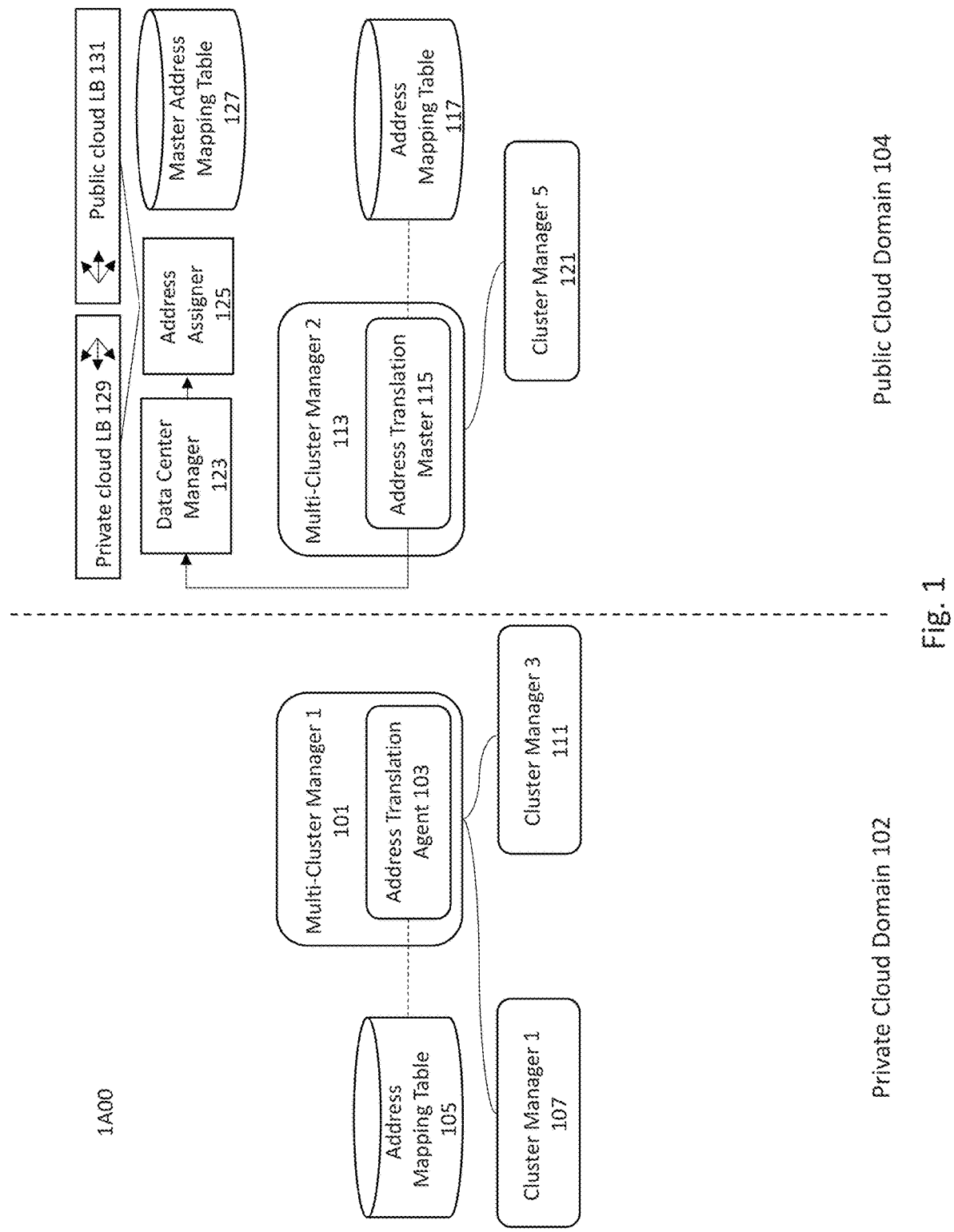
FIG. 1 illustrates a system diagram in which embodiments of the present disclosure can be implemented, as according to some embodiments.

Embodiments in accordance with the present disclosure address the problem of implementing network address translation services between private cloud domains and a public cloud domain without using raw IP addresses. Some embodiments are directed to approaches for implementing a framework to facilitate network address translation services between a private cloud domain and a public cloud domain to communicate over load balancers. The accompanying figures and discussions herein present example environments, systems, methods, and computer program products for network address translation services.

OVERVIEW

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout the specification to "some embodiments" or "other embodiments" refer to a particular feature, structure, material or characteristic described in connection with the embodiments as being included in at least one embodiment. Thus, the appearance of the phrases "in some embodiments" or "in other embodiments" or in various places throughout this specification are not necessarily referring to the same embodiment or embodiments. The disclosed embodiments are not intended to be limiting of the claims.

Reference is now made in detail to certain embodiments. The disclosed embodiments are not intended to be limiting of the claims.

Descriptions of Example Embodiments

FIG. 1 illustrates a computing environment 1A00 in which embodiments of the present disclosure can be implemented. As an option, one or more variations of computing environment 1A00 or any aspect thereof may be implemented in the context of the architecture and functionality of the embodiments described herein. The techniques or any aspect thereof may be implemented in any environment.

The embodiments shown in FIG. 1 depict a hybrid cloud environment with a network address translation service implemented to permit a data-center running in a private cloud domain to communicate with a data center on the public cloud domain over load balancers. The address translation service ensures that all the services that need to communicate with data-centers can be reached, e.g., over load balancers rather than their raw IP:port addresses.

A hybrid cloud environment refers to services that use a combination of different clouds, including private and public clouds. The applications and data are migrated and/or transferred between these clouds using either standardized or specific protocols/processes. As an example, typical use cases include using separate clouds for different layers of multi-tier applications. For example, in a 3-tier application stack, the presentation service might reside on the public cloud, the application service might reside on a managed private cloud, and the database service might reside on an on-premise private cloud.

Here, the hybrid cloud environment is split into a private cloud domain 102 and a public cloud domain 104. In some embodiments, the private cloud domain 102 is also referred to as a customer routing domain. In some embodiments, the private cloud domain 102 is referred to as a customer on-premise datacenter. In other embodiments, there may be multiple private cloud domains that can connect to an integrated public cloud environment such that each private cloud domain belongs to a separate entity. The hybrid cloud environment allows users to leverage both public cloud infrastructure as a service and private cloud infrastructure in their own data centers. This results in a hybrid cloud environment using software that spans in-house and public cloud-deployments.

The private cloud refers to cloud services that are provisioned for exclusive use by one end user organization. The private clouds can be owned, operated, and delivered by either the end-user organization, external service providers, or some combination of the two. The infrastructure can be located either on-premises (On-Prem) or off-site (i.e., hosted). Private clouds that are managed by external service providers are typically called managed (private cloud) services. Private clouds are typically used for critical workloads where there are specific requirements for performance, availability, or security.

Each public cloud domain and private cloud domain contains a distributed resource management platform that allows users to manage and monitor objects and services across the virtualized environment. The resource management platform is broken down into two main components: a multi-cluster manager (e.g., 101, 113) and localized cluster managers (e.g., 107, 109, 111, 119, 121).

In some embodiments, the multi-cluster manager (e.g., 101 and 113) consists of one or more virtual machines (VMs) treated as a single instance that monitors and manages registered clusters. The multi-cluster manager (e.g., 101 and 113) is responsible for providing a single, centralized management interface. The multi-cluster manager (e.g., 101 and 113) also provides management for different clusters across separate physical locations on one screen and offers an organizational view into a distributed environment. The multi-cluster manager corresponds to a 1-to-many cluster manager.

The cluster managers (e.g., 107, 109, 111, 119, 121) are localized cluster managers that are responsible for local cluster management and operations. In some embodiments, the cluster manager is a service built into the platform for deployed clusters. The cluster manager provides the ability to fully configure, manage and monitor clusters running any hypervisor. The cluster-manager corresponds to a 1-to-1 cluster manager.

The private cloud domain 102 contains an address translation agent 103 that discovers localized cluster managers 107, 109, 111 and nodes in the private cloud environment. Specifically, the address translation agent 103 performs periodic discovery of cluster nodes and publish the cluster structure to the address translation master 115 over fanout RPC. This will trigger a task at the address translation master 115, which talks to the data center manager 123 and fetches translations for the provided cluster structure. As part of an RPC return object, the translations are then made available to the address translation agent 103. The address translation agent 103 also maintains the translations for handles that are part of the multi-cluster manager in the address mapping table 105.

The public cloud domain 104 also comprises a data center manager 123, an address assigner 125, a private cloud load balancer 129, a public cloud load balancer 131, and a master address mapping table 127. The public cloud domain 104 also contains an address translation master 115 that configures the address assigner module 125 through the data center manager 123. The address translation manager 115 also communicates with the data center manager 123 to generate mappings as well as respond to the address translation agent 103 with updated mappings. The address translation manager 115 will also perform the functions of the address translation agent 103 such as discovering localized cluster managers and nodes in the public cloud environment and maintaining the translations for handles that are part of the multi-cluster manager in the address mapping table.

The private cloud load balancer 129 or on-premise load balancer (OLB) and the public cloud load balancer 131 (also referred to herein as Public Cloud Load Balancer or CLB) are used by the two data centers (e.g., private cloud domain 102 and the public cloud domain 104) to avoid conflicting subnets. The private cloud load balancer 129 is used with services in the public cloud domain to connect with services in the private cloud domain. In a similar fashion, the public cloud load balancer 131 is used with services in the private cloud domain 102 to connect with services in the public cloud domain 104. For multiple services in a datacenter, the corresponding load balancer is programmed with different port numbers that map to these services. For example, a service running at IP-1: port in a private cloud domain will have an OLB-IP:port2 that the public cloud domain will use to reach the service.

The master mapping table 127 contains information such as destination availability zone ID, source availability zone ID, the raw IP port, and a translated handle. The destination availability zone ID allows multiple mappings for multiple data centers for the same node. Similarly the address mapping table 105 and 117 also contains information such as destination availability zone ID, the raw IP port, and a translated handle for their respective domains.

Figure 2:
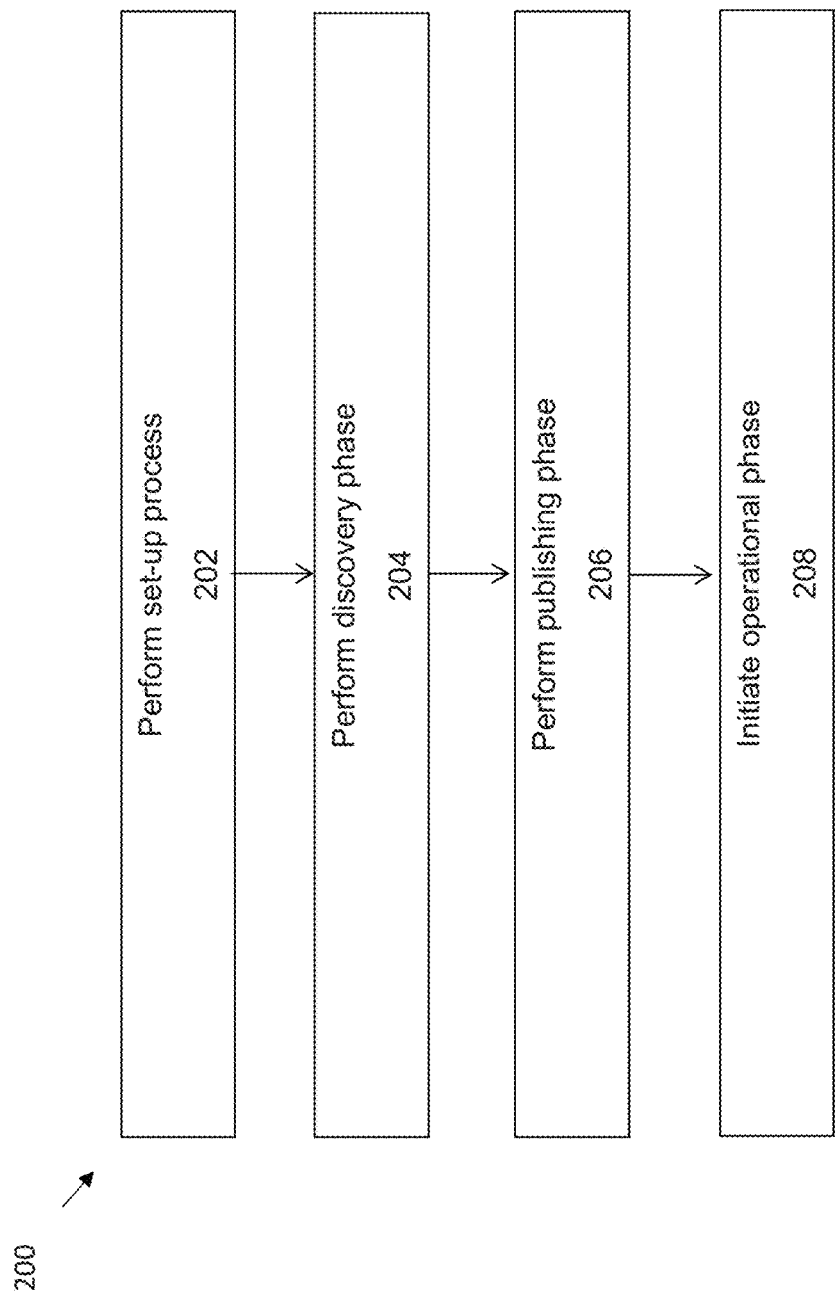
FIG. 2 illustrates a flowchart of an approach to implement network address translation services between private cloud domains and a public cloud domain, as according to some embodiments.

FIG. 2 illustrates a flowchart 200 for a high-level approach for implementing network address translation services between private cloud domains and a public cloud domain One of the key principles of this approach is enabling a data-center running in a private cloud domain to communicate with the public cloud domain via only translated handles and not with the actual IP:port addresses. As such, the multi-cluster manager in the private cloud domain is only aware of its own translations and the multi-cluster manager in the public cloud domain is only aware of its own translations. The purpose of an address translation service is to allow an operating system for a hyper-converged infrastructure platform to work with Virtual IP addresses.

The role of the address translation services includes determining missing mappings, initiating configuration of the load balancers, and providing the relevant service with the load balancer handles. When a new node is added to a private cloud domain (e.g., on-premise data center), the address translation agent determines what mappings are missing and communicates with the address translation master to populate the missing mappings, as will be described in greater depth in FIG. 9. The address translation master may also initiate configuration of the private cloud domain with new mappings.

The address translation service ensures that all the services that need to communicate across data-centers can be reached over load-balancers. The address translation service at the private cloud domain and the public cloud domain are provided with mapping information such that the services know how the remote cluster can reach itself over the load balancer. As such, when providing a remote cluster with its service handle, it will provide the load balance handle instead of the raw handle.

At step 202, the set-up process begins by identifying clusters in the private cloud domain and the public cloud domain. The clusters can be identified in response to various events, e.g., start of services, node addition, node removal, etc. At this point, the multi-cluster manager on the public cloud side does not know anything about the specific IP addresses within the multi-cluster manager on the private cloud side. The multi-cluster manager on the public cloud environment only knows about the specific IP addresses of the clusters on its own side.

In response to identifying the clusters, the discovery phase is performed in both the private cloud domain and in the public cloud domain at 204. For example, the discovery phase identifies the build of the cluster structure such as how many cluster managers are being managed and how many nodes are involved with each cluster manager.

In addition, the discovery phase may also determine the different types of services that will require translation services. The discovery phase will be described in more detail in FIG. 5. The cloud services include services ranging from infrastructure to platform to software that are available for general public use. These services are generally owned, operated, and delivered by public cloud service providers in their own datacenters. The public cloud services deliver integrated public cloud services built on a common cloud operating environment that spans both the private and public cloud, while giving choice of workload placement based on budget, performance, availability, and scale requirements. The public cloud service duplicates the on-premises stack in a hosted environment. The public cloud services allow software to be consumed as a service by other cloud environments such as Amazon Web Services, Google Cloud Platform, and Microsoft Azure. The public cloud services may provide specialized services such as workload optimization, capacity bursting, test/development, data analytics, and disaster recovery.

Subsequently, the publishing phase sends structural information at 206. Here, customers on the private cloud domain will publish their own infrastructure (e.g., how many nodes are serviced by a cluster manager, how many IP addresses need translating, etc.) to the address translation master on the public cloud domain. The public cloud domain does not need to publish its own infrastructure because the address translation master is already aware of the public cloud domain infrastructure by virtue of cluster deployment on the public domain side during the public cloud on-boarding process.

At the 208, after the discovery phase and publishing phase are complete, each cluster is now aware of its translations from their own populated mapping tables in an operational phase. At this point, the nodes are visible in the system and ready for application targets.

The advantages of implementing an address translation service is that all the services that communicate across data-centers can be reached over load-balancers rather than using raw IP and port addresses that may be in conflict with each other. The private cloud network and the public cloud network are in different routing domains so there is no way for each service to avoid a conflict of subnets in use at either ends. The problem is compounded when multiple private cloud networks are connected to the same public cloud network.

The address translation service provides several advantages over the legacy approach. First, all the software logic remains the same except for the returning of the translated addresses, which will be explained below. Second, the public side cloud domain networking remains hidden from the customer. As such, any updates to the public side cloud domain can be managed by configuring the load balancer. Also, the addition and removal of nodes and re-IPing are handled automatically by the address translation service.

Setup Phase

FIG. 3 shows a flowchart for setting up network address translation services between private cloud domains and a public cloud domain. As an option, one or more variations for setup may be implemented in the context of the architecture and functionality of the embodiments described herein. The setup thereof may be implemented in any environment. In some embodiments, the steps may be performed in an order different from that described in FIG. 3.

The process starts at 302, where the public cloud onboarding process is initiated. In some embodiments, the public on-boarding process deploys multi-cluster manager/nodes and the cluster managers/nodes in the public cloud domain. In some embodiments, the public cloud onboarding process can be controlled through a user interface.

At 303, the multi-cluster manager on the public cloud domain pre-allocates nondenominational address handles. In some embodiments, the multi-cluster manager will communicate with the data center manager to generate placeholders for the multi-cluster managers in the master mapping table. The data center manager is able to pre-allocate private cloud load balancers for the multi-cluster manager in the private cloud domain because the data center manager is able to globally view all the clusters in both the private cloud domain and in the public cloud domain. For multiple services in a datacenter, the load balancer can be programmed with different port numbers that map to the different services. For example, a service running at IP-1:port1 in a private cloud domain will have a OLB-IP:port2 that the public cloud domain will use to reach the service. Subsequently, the master mapping table on the public cloud domain is filled out by the address assigner module.

At 304, an initial communication is sent from the multi-cluster manager on the private cloud domain to the multi-cluster manager on the private cloud domain. The communication request informs the public cloud domain multi-cluster manager that the private cloud domain multi-cluster manager wants to connect with the public cloud domain as an on-premise cluster and also to begin allocating translated handles for the private cloud domain. At 306, the initial pairing between the multi cluster managers on the private cloud domain and the public cloud domain begins. Here, the multi-cluster manager on the public cloud domain receives the initial communication request from the multi-cluster manager on the private cloud domain. Pairing between multi-clusters can be implemented by some or all of the following steps: (1) Create remote connection objects that encapsulate the connection between the two multi-clusters; (2) At the on-premise cloud, the remote connection object will be created with the public cloud load balancer IP and port, so that the on-premise cloud can talk to the public cloud at this point; (3) At the public cloud, the remote connection objects are created with the pre-allocated nondenominational address handles for on-premise site; at this point, the public cloud cannot talk to on-premise cloud because the mapping for on-premise is not configured just yet; (4) The Availability Zone objects are encapsulations that include AZ ID and the remote connection objects mentioned in 2 and 3.

At this point, the services on the address translation agent and the address translation master begin at 310. Once address translation services starts, the rest of the discovery and mapping will occur.

Figure 4A:
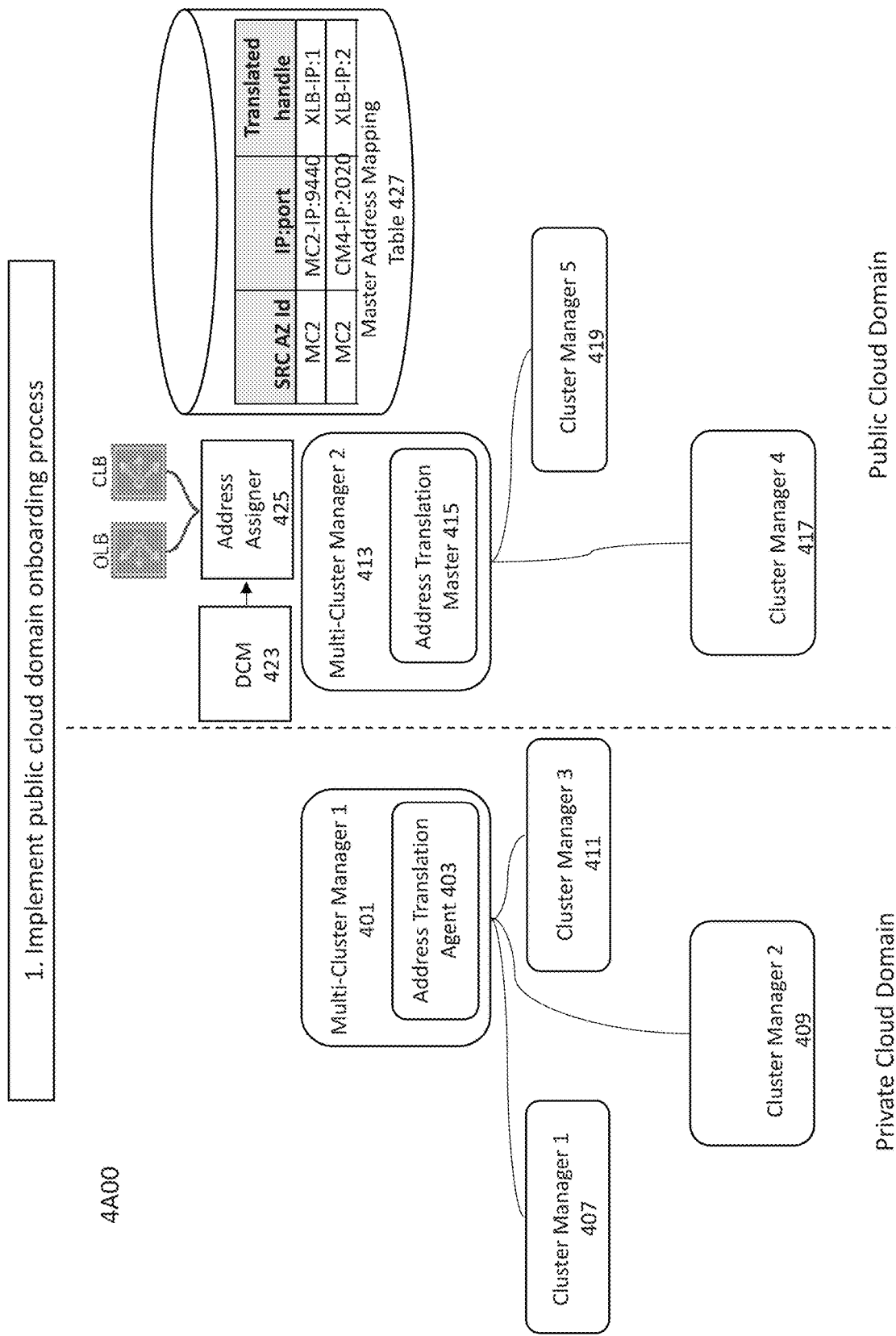
FIG. 4A-D illustrates an approach to set-up network address translation services, as according to some embodiments.

FIGS. 4A-D illustrates an example of setting up network address translation services. FIG. 4A illustrates an initial public-cloud onboarding process that deploys the multi-cluster manager/nodes 413 and the cluster manager/nodes 417, 419 in the public cloud domain with cluster external IP addresses. In some embodiments, the public cloud load balancer or CLB is statically configured to assign ports on the public cloud onboarding IP for the public cloud domain multi-cluster managers and cluster managers. In addition, a script calls the address translation master RPC at the multi-cluster manager to publish the IP mappings (public cloud availability zone ID, <Xi-IP:port>:<CLB IP:port>). Here, the master address mapping table 427 is filled out in response to the public cloud domain onboarding process and the multi-cluster pairing.

Figure 4B:
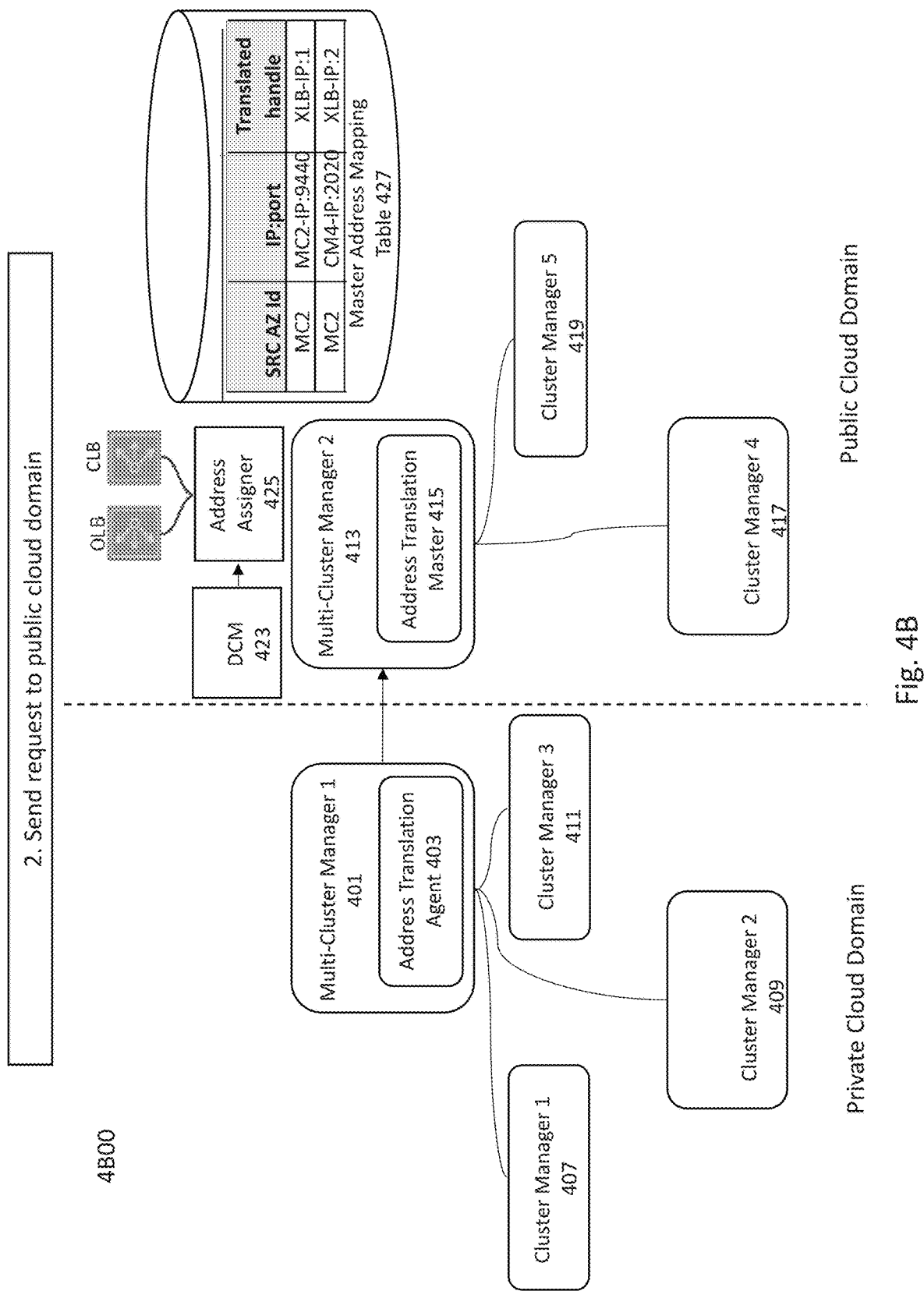

FIG. 4B illustrates the multi-cluster manager on the private cloud domain sending an initial communication from the private cloud multi-cluster manager 1 401 to the public cloud multi-cluster manager 2 413. The initial communication informs the multi-cluster manager 2 413 on the private cloud domain that the multi-cluster manager 1 401 wants to connect to the public cloud domain. In some embodiments, the initial communication request also informs the address translation master 415 on the public cloud domain to start allocating IP addresses in the master address mapping table 427 to the multi-cluster manager on the private cloud domain.

Figure 4C:
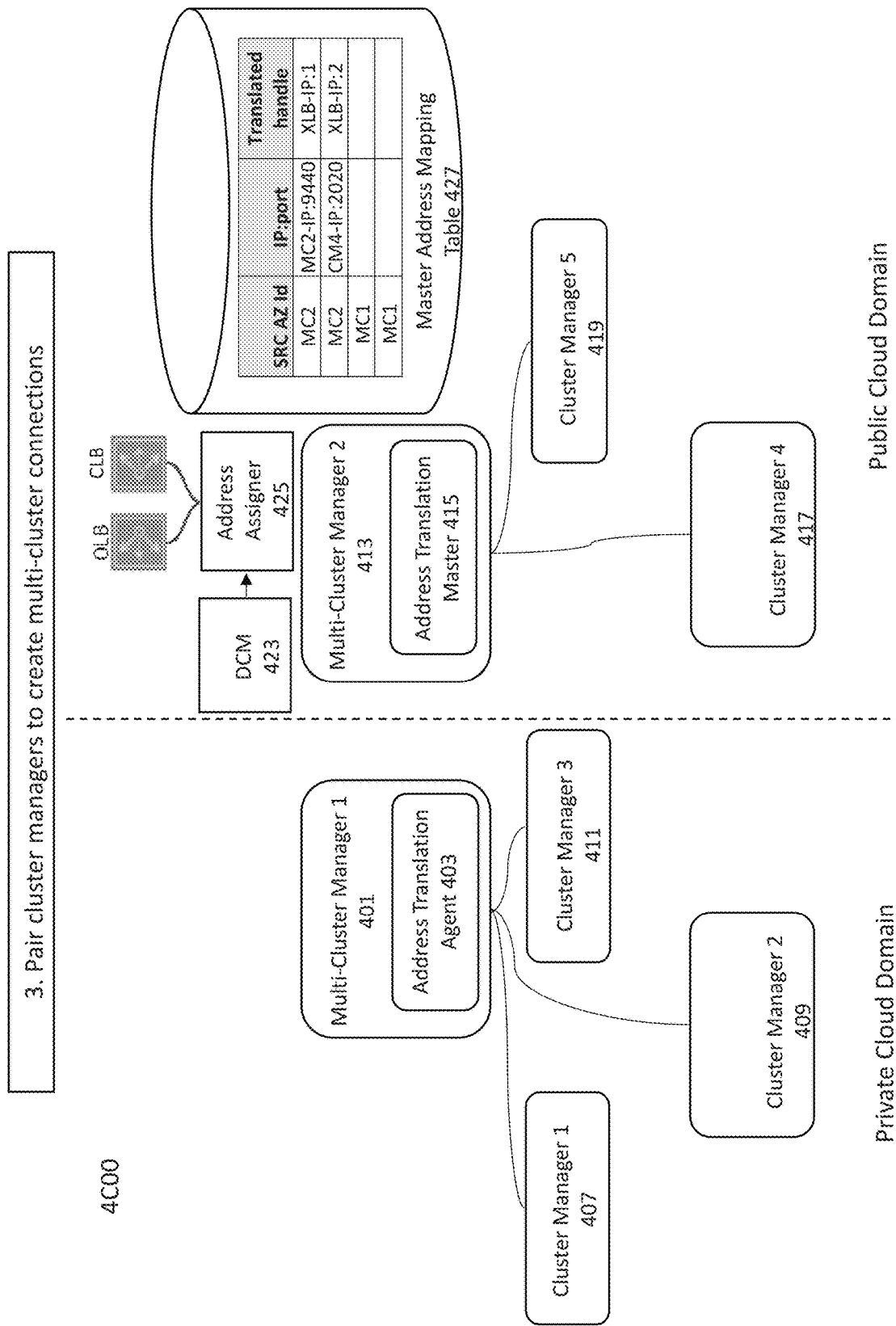

FIG. 4C illustrates the multi-cluster managers 401 and 413 being paired together to create multi-cluster connections between the private cloud domain and the public cloud domain. These multi-cluster connections are the underlying transport over which any communication across the availability zones occur. In addition, the mappings from the public cloud domain are also known in the master mapping table 427, but only the translated handle for the private cloud domain have been allocated in the master mapping table.

Figure 4D:
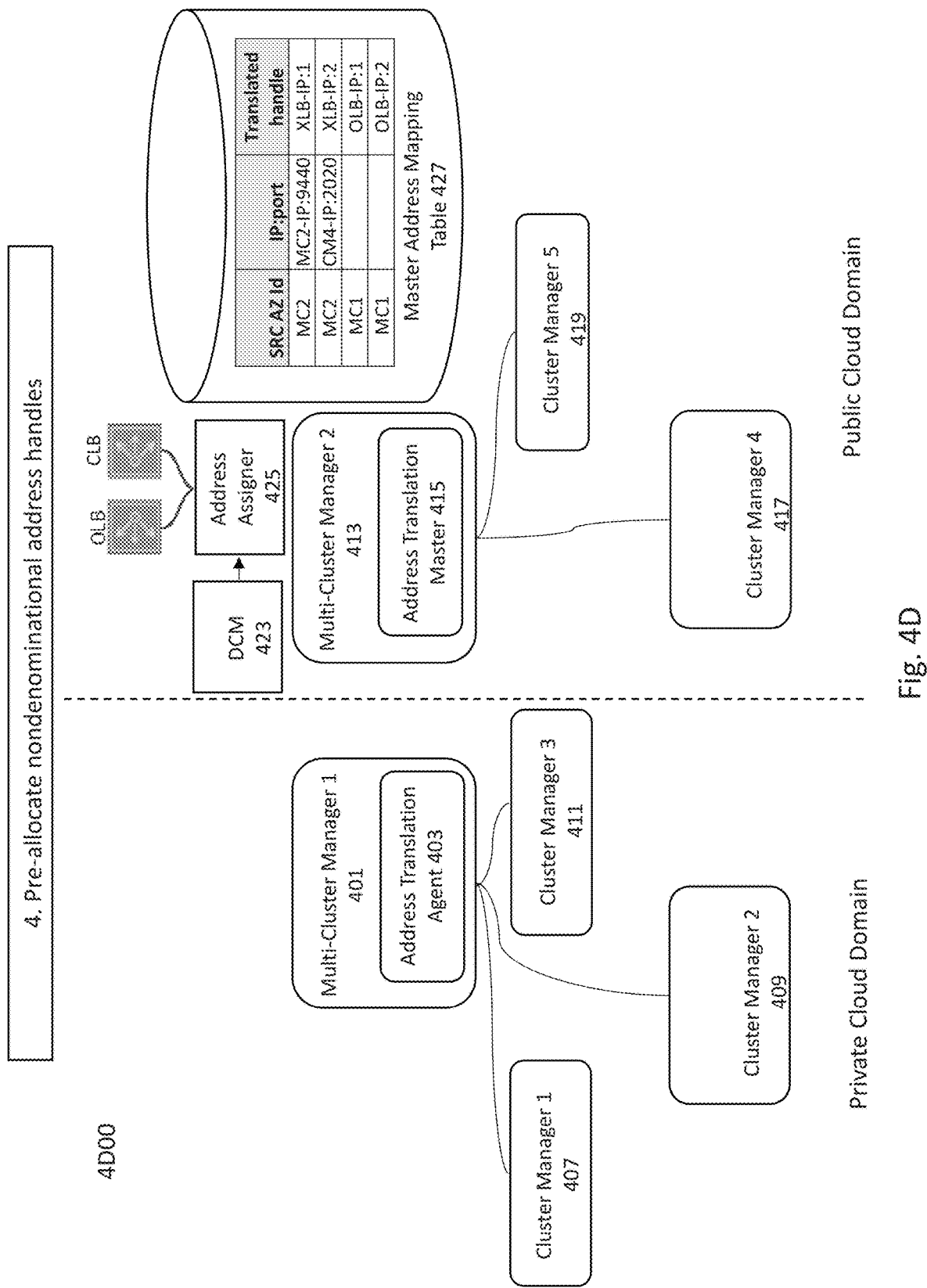

FIG. 4D illustrates the address assigner pre-allocating nondenominational address handles for the private cloud domain. The address assigner assigns a pool of private cloud domain addresses (e.g. OLB-IP:1 and OLB-IP:2) that will be allocated upon requests from the private cloud domain. The master address mapping table does not allocate any IP:port addresses for the private cloud domain yet. The address assigner 425 allocates the IP addresses as placeholders for future requests from the nodes in the private cloud domain.

Discovery Phase

Figure 5:
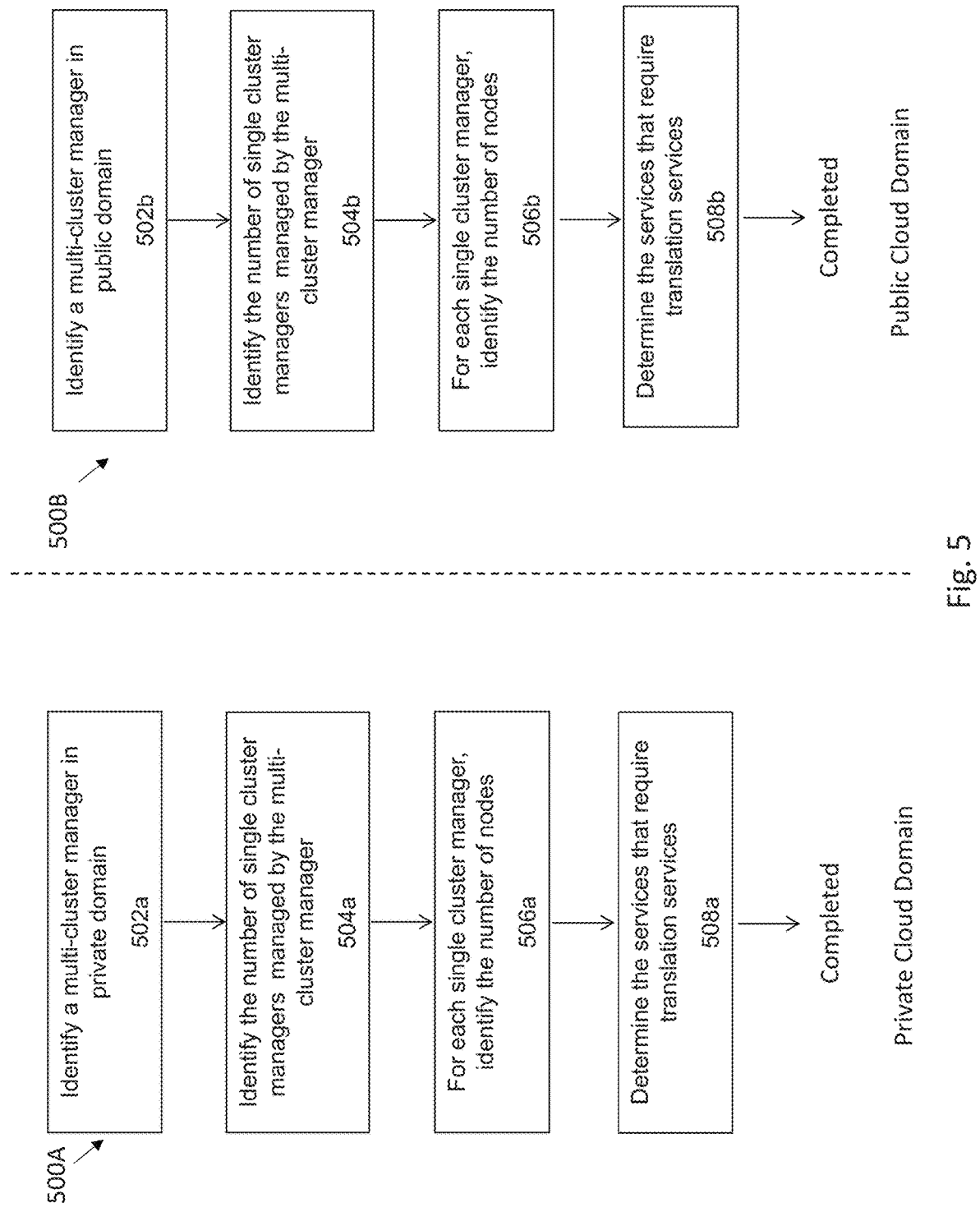
FIG. 5 illustrates a flowchart of an approach to implement a discovery process, as according to some embodiments.

FIG. 5 presents a flowchart for performing a discovery process in the private cloud domains 500A and a public cloud domain 500B as used to implement a network address translation service. As an option, one or more variations of the discovery process 500A and 500B or any aspect thereof may be implemented in the context of the architecture and functionality of the embodiments described herein. The discovery process technique 500A and 500B or any aspect thereof may be implemented in any environment. In some embodiments, the steps may be performed in an order different from that described in FIG. 5.

The embodiment shown in FIG. 5 is merely one example. The address translation service provides a mechanism whereby the infrastructure of the multi-cluster managers and cluster managers are identified. The address translation service will also determine how many cluster managers are being identified by the multi-cluster managers and how many nodes belong to each cluster manager.

Initially, the address translation agent identifies a multi-cluster manager in the private cloud domain at 502a. Depending on the multi-cluster manager, the address translation agent identifies the number of single cluster managers that are managed by the multi-cluster manager at 504a. At 506a, for each single cluster manager, the address translation agent identifies the number of nodes. Finally, at 508a the address translation agent determines the cloud services that require translation services. The cloud services refer to all services delivered by cloud service providers, including infrastructure (including storage, compute, etc.), platform (to run applications), and software (consumed directly by the end user, including CRM, email, and virtualized desktops).

The same process that was described above is performed by the address translation master in the public cloud domain. The address translation master identifies a multi-cluster manager in the public cloud domain at 502b. Subsequently, the address translation master will identify the single cluster managers that are being managed by the identified multi-cluster manager at 504b. Then, for each single cluster manager, the number of individual nodes are identified at 506b. Finally, at 508b, the address translation master will also determine the cloud services that require translation services in the public cloud domain. In some embodiments, the services that need translation will differ from the private cloud domain.

Publishing Phase

Figure 6:
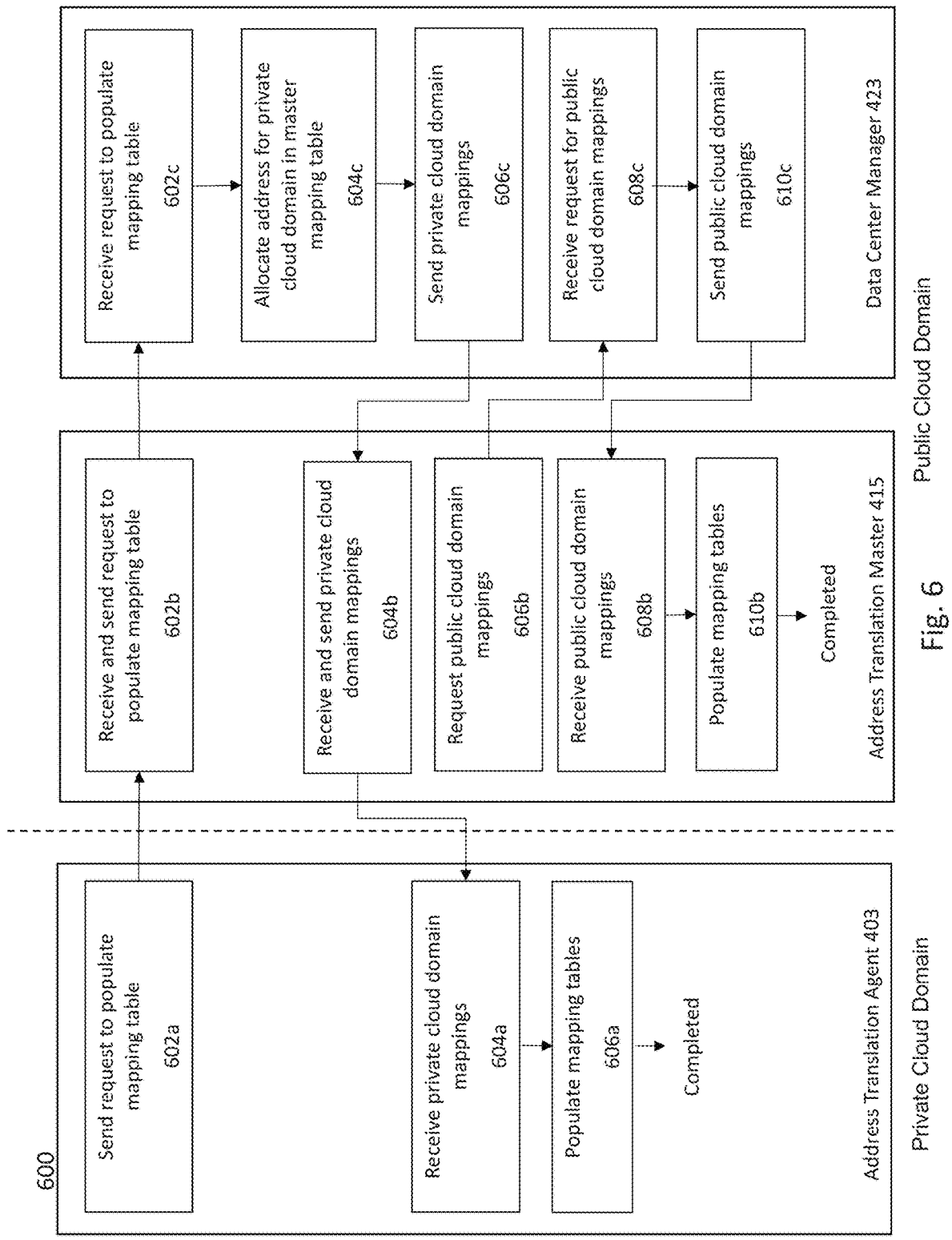
FIG. 6 illustrate a flowchart of an approach to implement a publishing phase, as according to some embodiments.

FIG. 6 presents a flowchart showing a set of publishing operations 600 as used to perform the publishing phase between the private cloud domain and the public cloud domain. As an option, one or more variations of the publishing operations 600 or any aspect thereof may be implemented in the context of the architecture and functionality of the embodiments described herein. The publishing operations 600 or any aspect thereof may be implemented in any environment. In some embodiments, the steps may be performed in an order different from that described in FIG. 6.

The embodiment shown in FIG. 6 is merely one example. The network address translation services provide a mechanism that populates the mapping tables for the private cloud domain and the public cloud domain.

At 602a, the address translation agent sends a request to populate the mapping table on the private cloud domain. The address translation master receives the request at 602b and sends the request to the data center manager at 602c. Next, the data center manager allocates addresses for the private cloud domain in the master mapping table in 604c. At 606c, the data center manager sends the private cloud domain mappings to the address translation manager. Here, the address translation manager receives the private cloud domain mappings and sends the mappings to the address translation agent at 604b. The address translation agent receives the private cloud domain mappings at 604a and populates the mapping table with the private cloud domain mappings at 606a.

At any point in the process, the address translation master can request public cloud domain mappings from the data center manager at 606b. Next, the data center manager will receive the request for public domain mapping at 608c and look up the master mapping table for that information. The data center manager will send the public cloud domain mappings back to the address translation master at 610c. Finally, the address translation master receives the public cloud domain mappings at 608b and will then be able to populate the mappings table on the public cloud domain at 610b.

FIGS. 7A-F illustrates an example of the publishing phase between the private cloud domain and the public cloud domain.

Figure 7A:
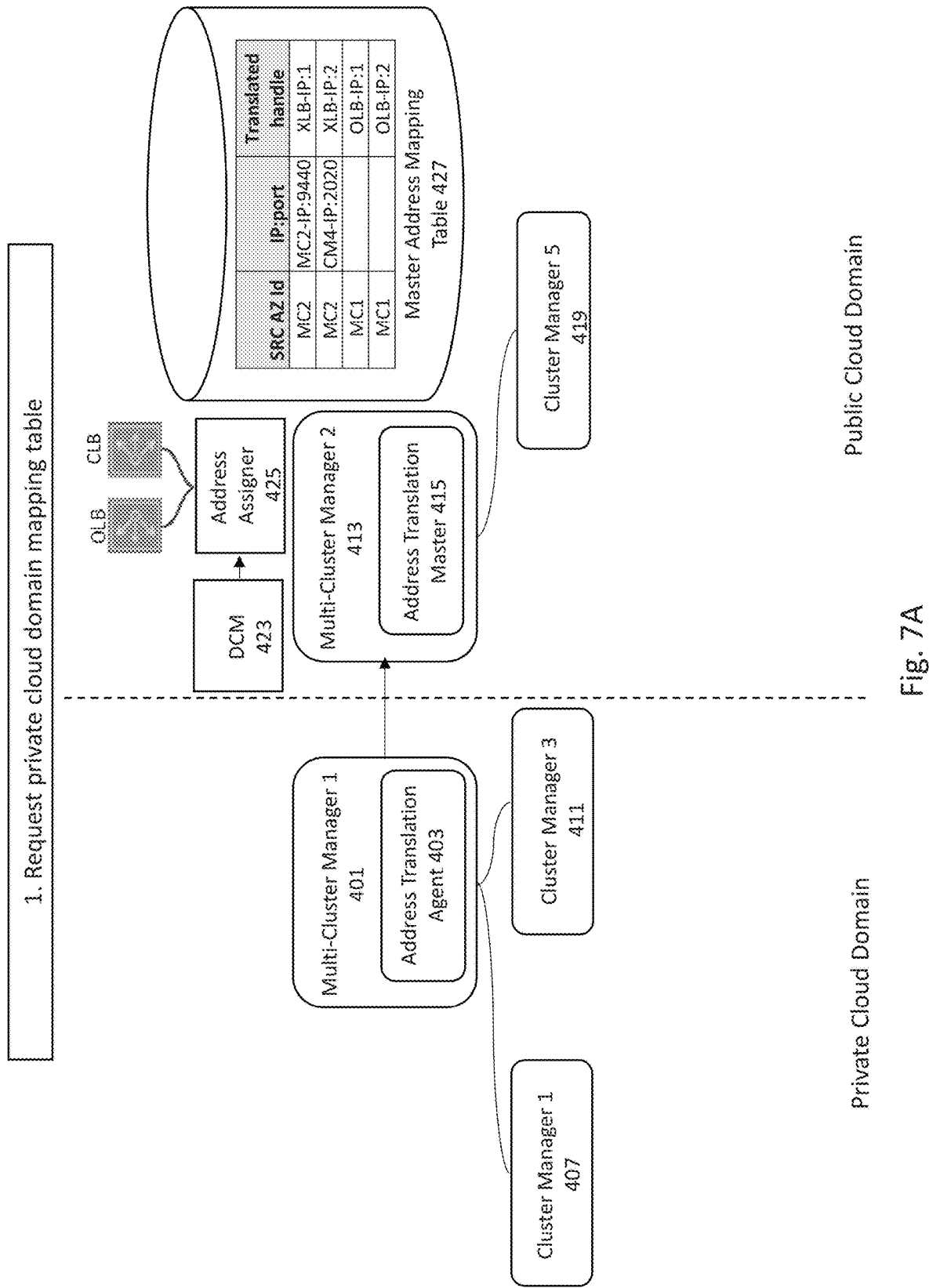
FIG. 7A-F illustrates an approach to implement the publishing phase, as according to some embodiments.
Figure 7B:
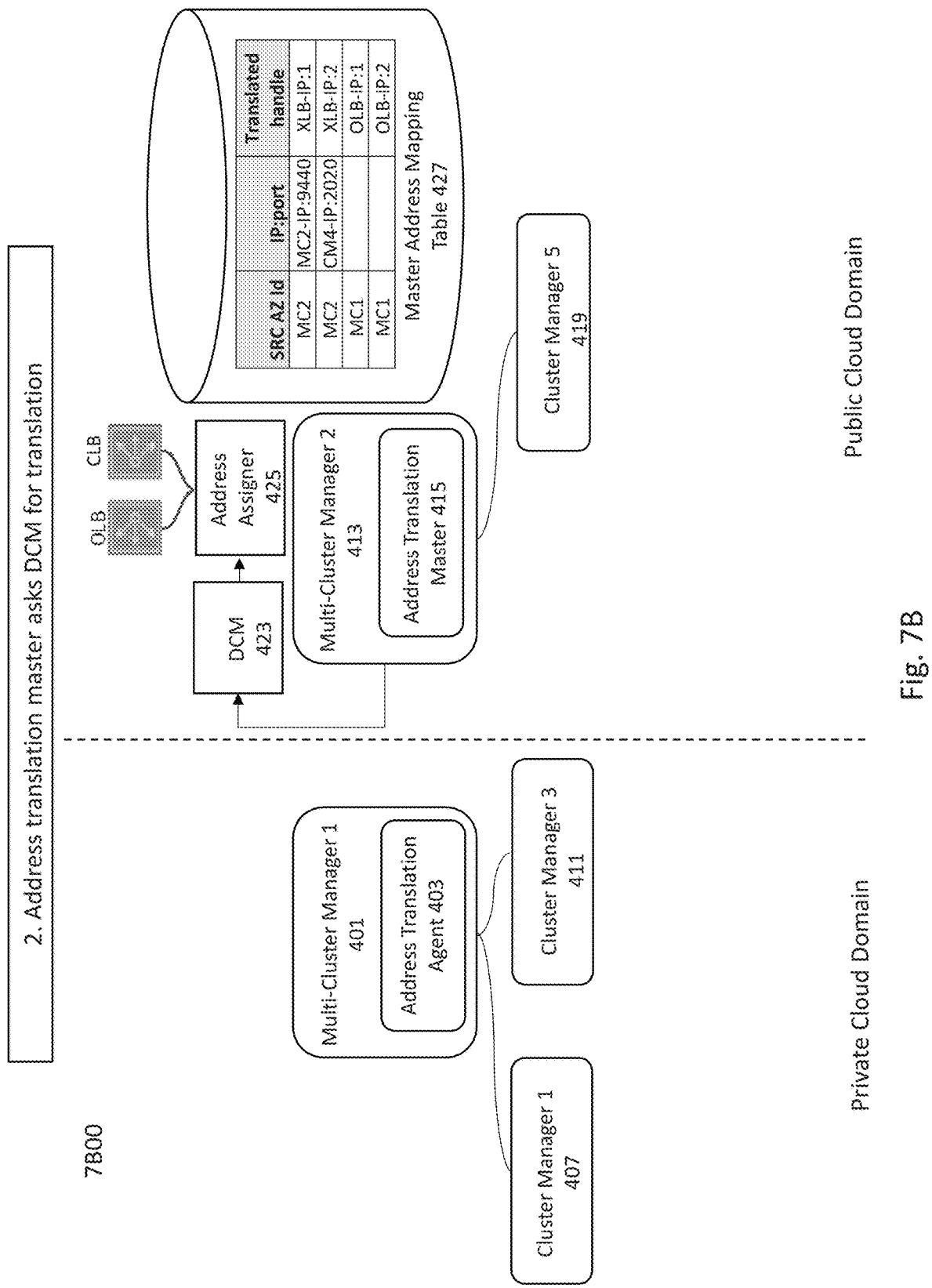
Figure 7C:
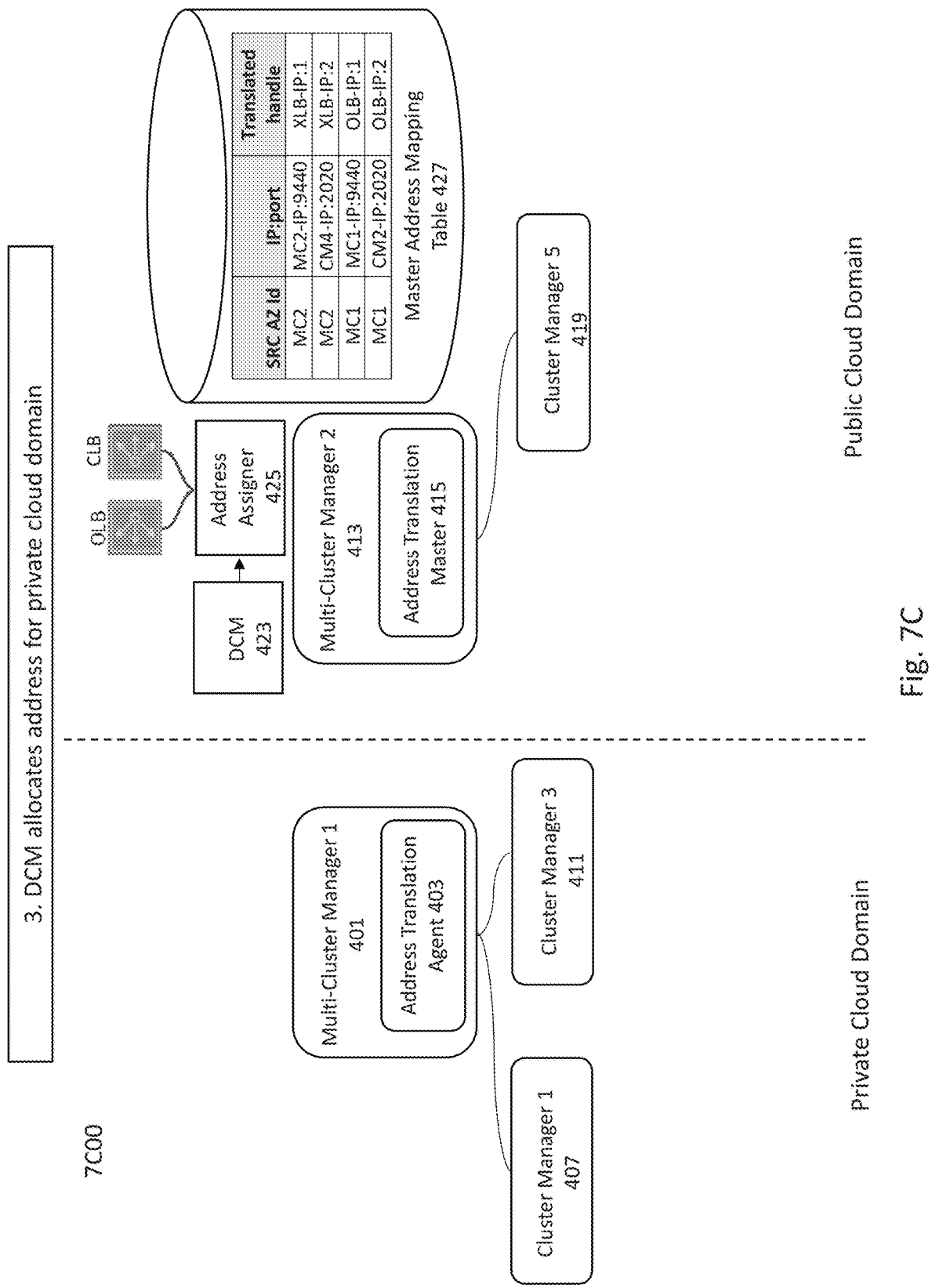
Figure 7D:
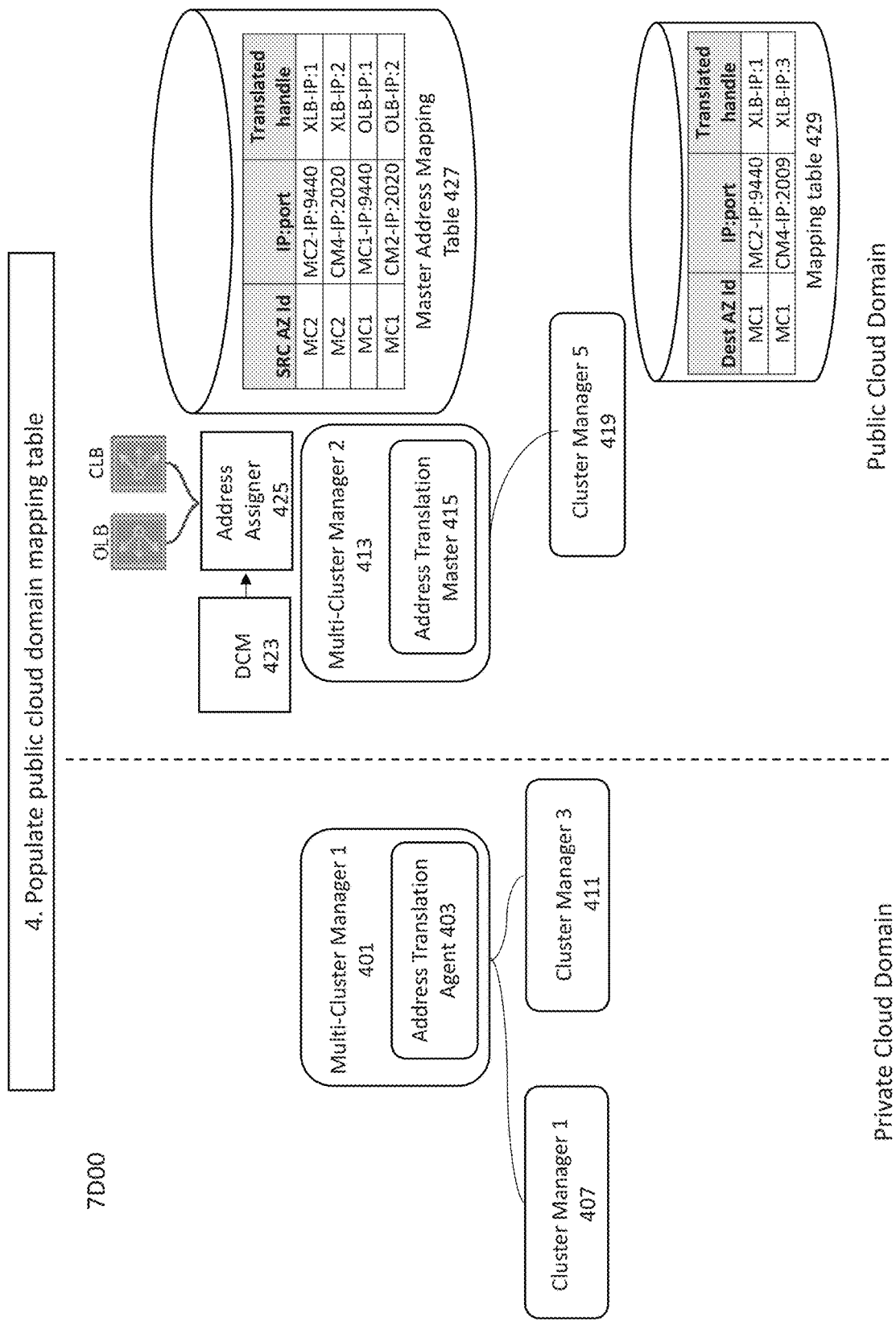

As shown in FIG. 7A, the address translation agent 403 on the multi-cluster manager 1 401 requests a private cloud domain mapping table. In FIG. 7B, the address translation master 415 asks the data center manager 423 for a translation. The data center manager 423 will use the master address mapping table 417 for the translation information. The data center manger allocates addresses for the private cloud domain in the master address mapping table 417, as shown in FIG. 7C. Here, the master address mapping table 417 is filled out and will later be used to respond to translation requests. In FIG. 7D, the master-cluster manager 2 413 can populate the public cloud domain mapping table 429.

Figure 7E:
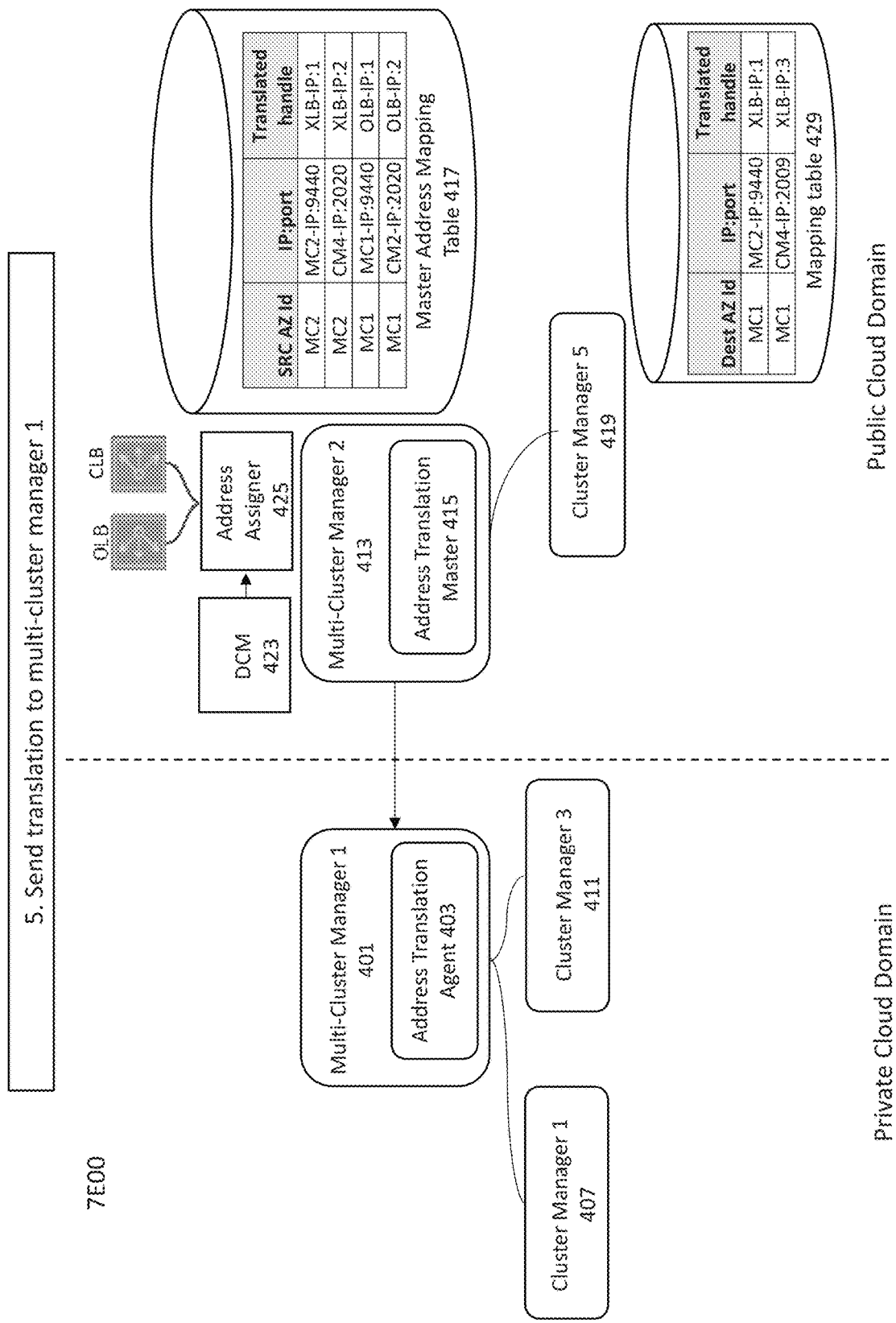
Figure 7F:
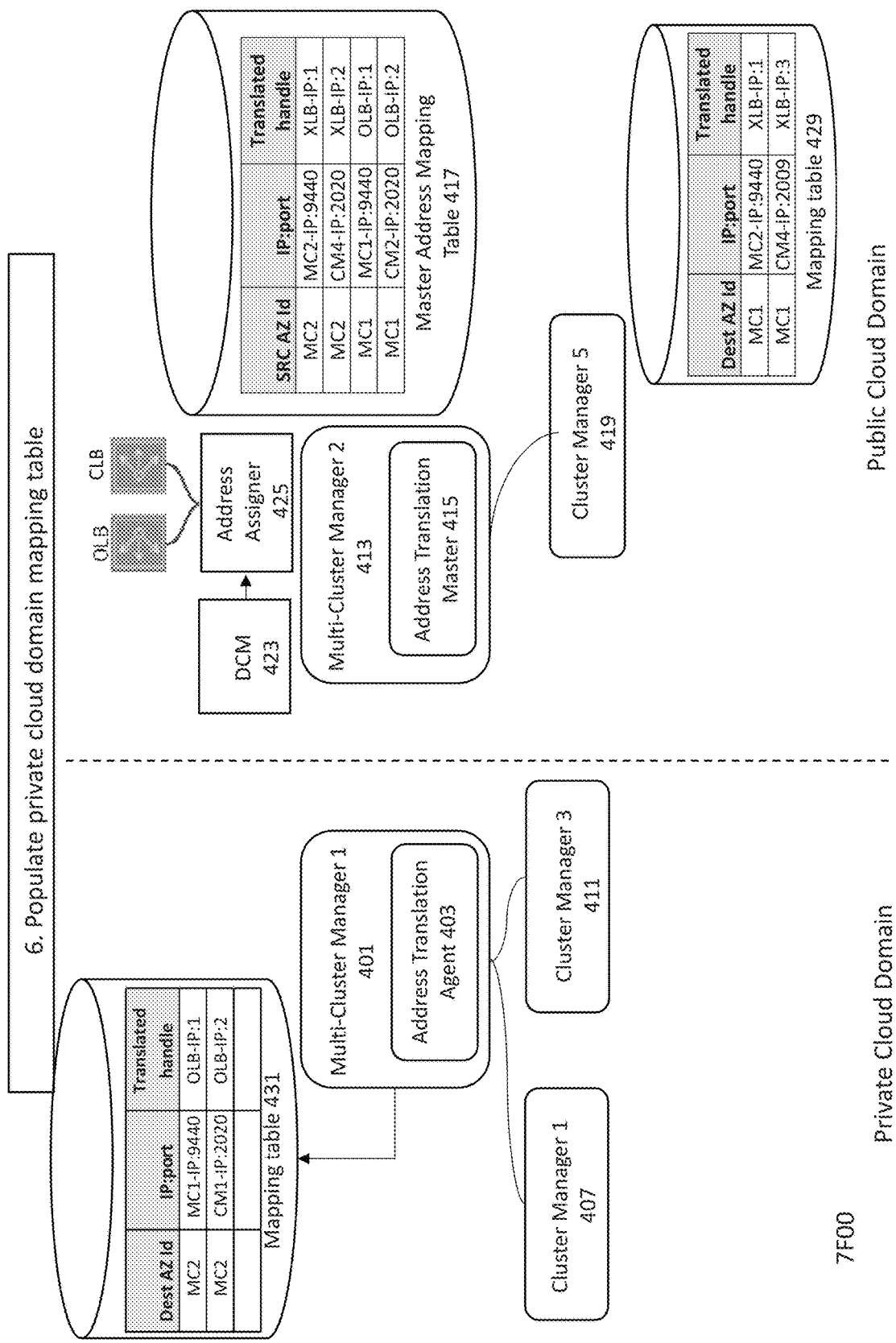

The multi-cluster manager 2 413 sends the translation to the multi-cluster manager 1 401 on the private cloud domain side, as shown in FIG. 7E. Finally, as shown in FIG. 7F, the address translation agent 403 can now populate a mapping table 431 for the private cloud domain.

Operational Phase

Figure 8:
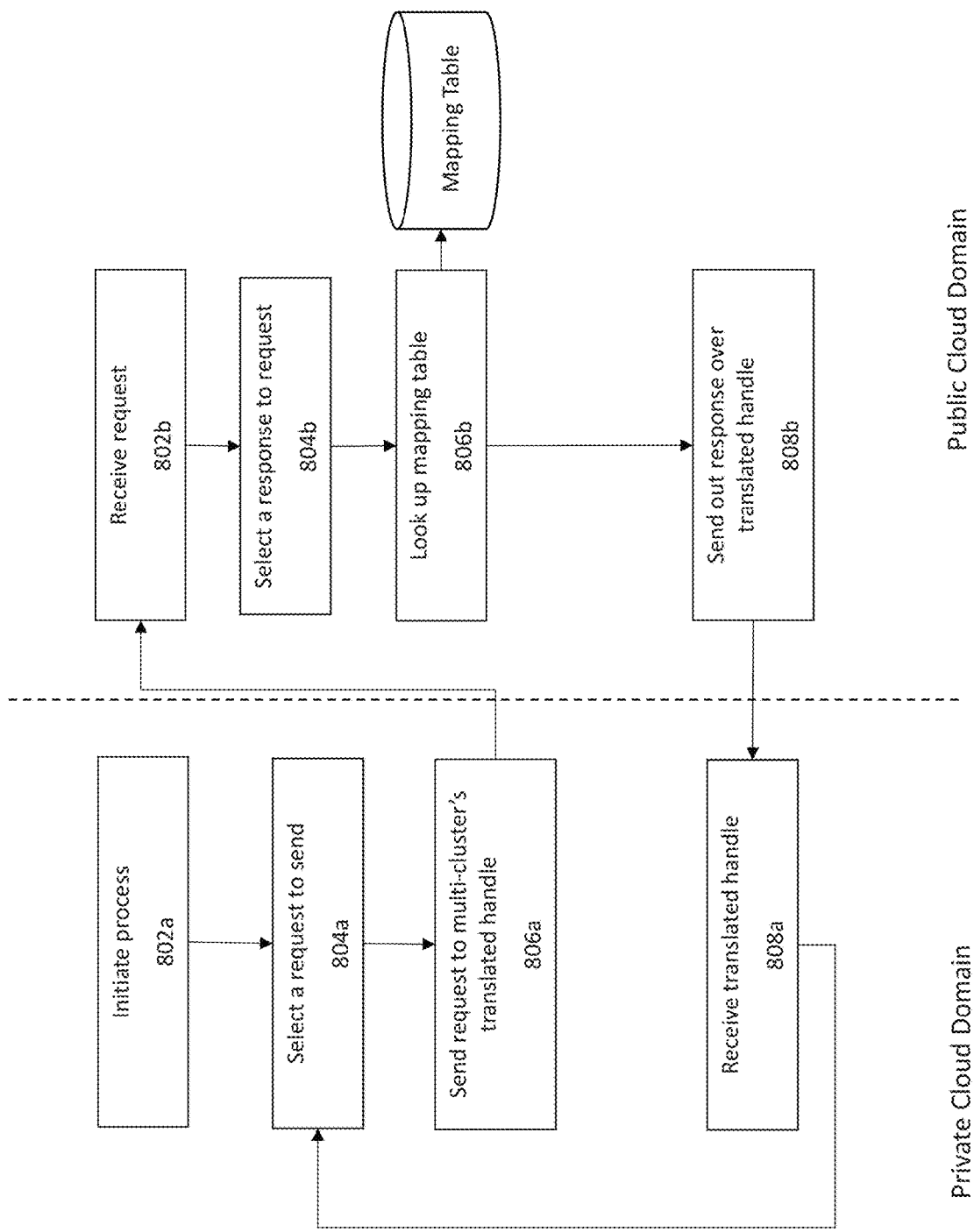
FIG. 8 illustrates a flowchart of an approach that implements an operational phase, as according to some embodiments.

FIG. 8 shows a flow for an operational phase of using the translation mapping services. In some embodiments, the steps may be performed in an order different from that described in FIG. 8.

The embodiments shown in FIG. 8 is merely one example. FIG. 8 illustrates a flowchart of a process for using the network address translation services. At 802*a*, a process is initiated by the multi-cluster manager on the private cloud domain. At 804*a*, the multi-cluster manager will select a request for sending to the public cloud domain. The remote site on the cluster manager on the private cloud domain will send a request to the multi-cluster's translated handle at 806*a*. It is noted that the private multicluster knows the translated handle as part of initial pairing.

At 802*b*, the remote site on the cluster manager on the public cloud domain receives the request. At 804*b*, the multi-cluster manager on the public cloud domain will select a response in relation to the request that was sent from the private cloud domain. The remote site on the public cloud domain will look up the mapping table at 806*b*. If the response involves returning the address handle (IP:port) of any of the services that run in the public cloud, then the multicluster or cluster manager at the public cloud will lookup the mapping table. Once the remote site identifies the translated nondenominational handle, the remote site on the public cloud domain will send the response over the translated handle rather than the raw IP address at 808*b*. In some embodiments, the translated handle is known from the initial pairing. At 808*a*, the remote site on the private cloud domain will receive the translated handle and the process can repeat by selecting another request to send to the public cloud domain.

Adding or Removing Nodes

Figure 9:
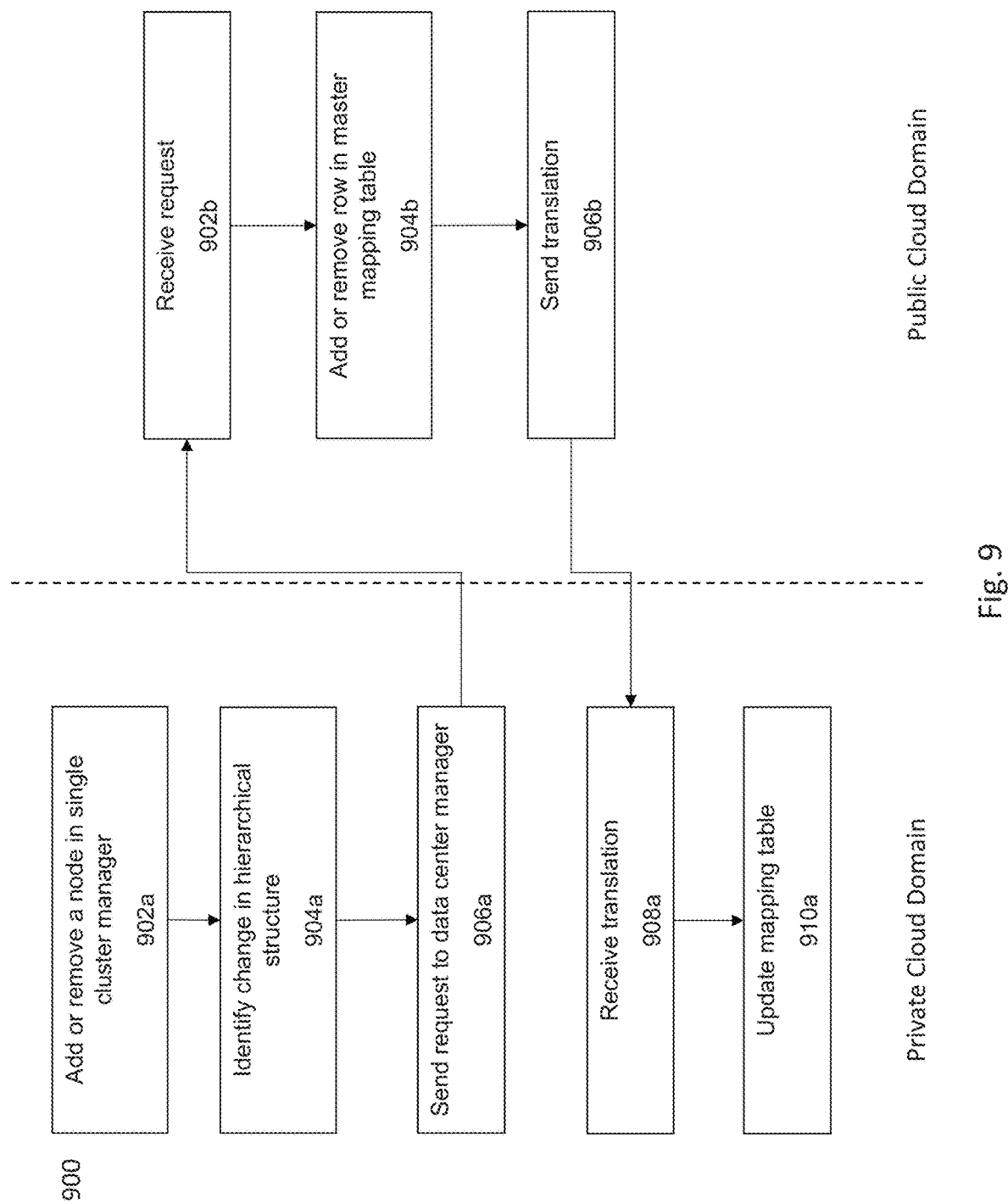
FIG. 9 illustrates a flowchart of an approach that adds or removes nodes, as according to some embodiments.

FIG. 9 shows a flow for an adding or removing a node from the system. The address translation agent will automatically discover when a new node is added or removed from the system. In some embodiments, the steps may be performed in an order different from that described in FIG. 9.

At 902*a*, a node is either added or removed to any single cluster managers. At 904*a*, the multi-cluster manager identifies a change in the hierarchical structure so it will need a new translation if a new node is added or remove a translation if the node is removed. At 906*a*, a request for updated translation mappings is sent to the data center manager for updating the master mapping tables.

At 902*b*, the request is received by the multi-cluster manager on the public cloud domain. At 904*a*, the master mapping table either removes a row if a node was removed or adds a row if the mode was added. At this point, the master mapping table is updated with the new hierarchical infrastructure on the private cloud domain and sends the translation back to the private cloud domain at 906*b*. Finally, the private cloud domain will receive the translations at 908*a* and update its mapping tables at 910*a*.

In some embodiments, if the multi-cluster manager on the private cloud domain is completely unpaired with the public cloud domain, then the mapping table on the private cloud domain may be deleted.

FIGS. 10A-D illustrate an exemplary example of using the network address translation services for a particular service.

Figure 10A:
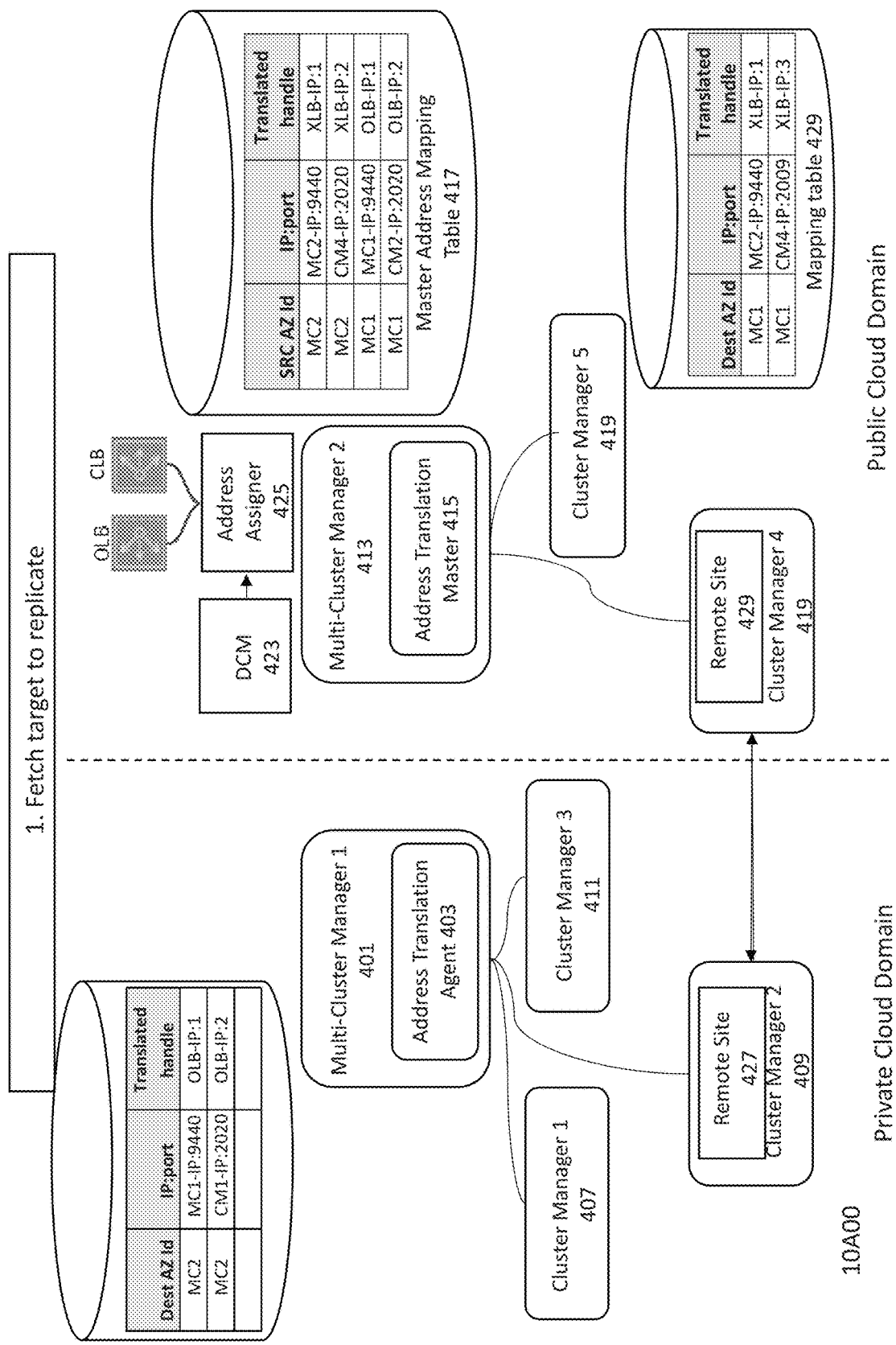
FIG. 10A-D illustrates a flowchart of an implementation of the translation services, as according to some embodiments.

In FIG. 10A, the cluster manager 2 409 will send a request to fetch a target to replicate.

Figure 10B:
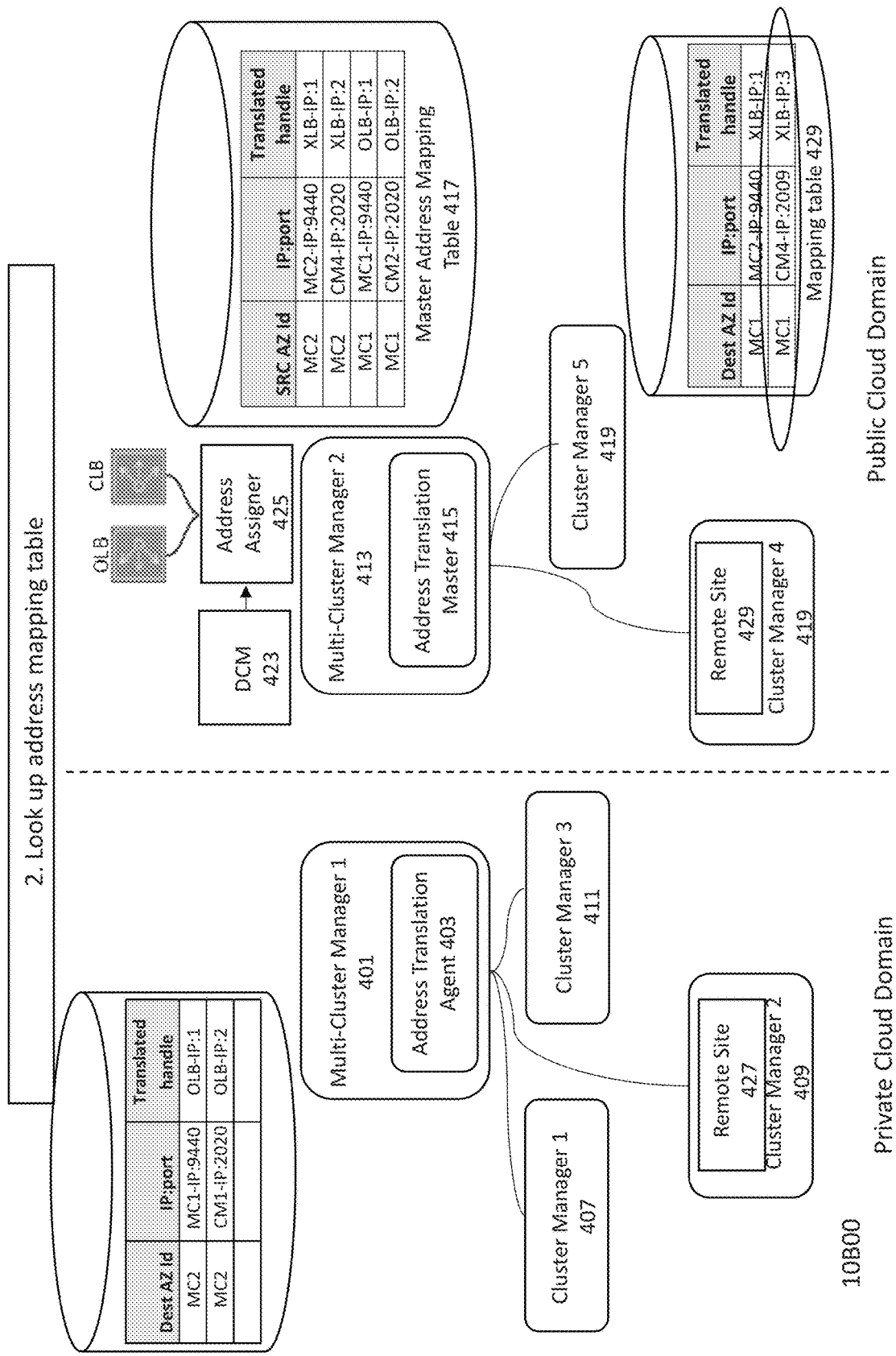
Figure 10C:
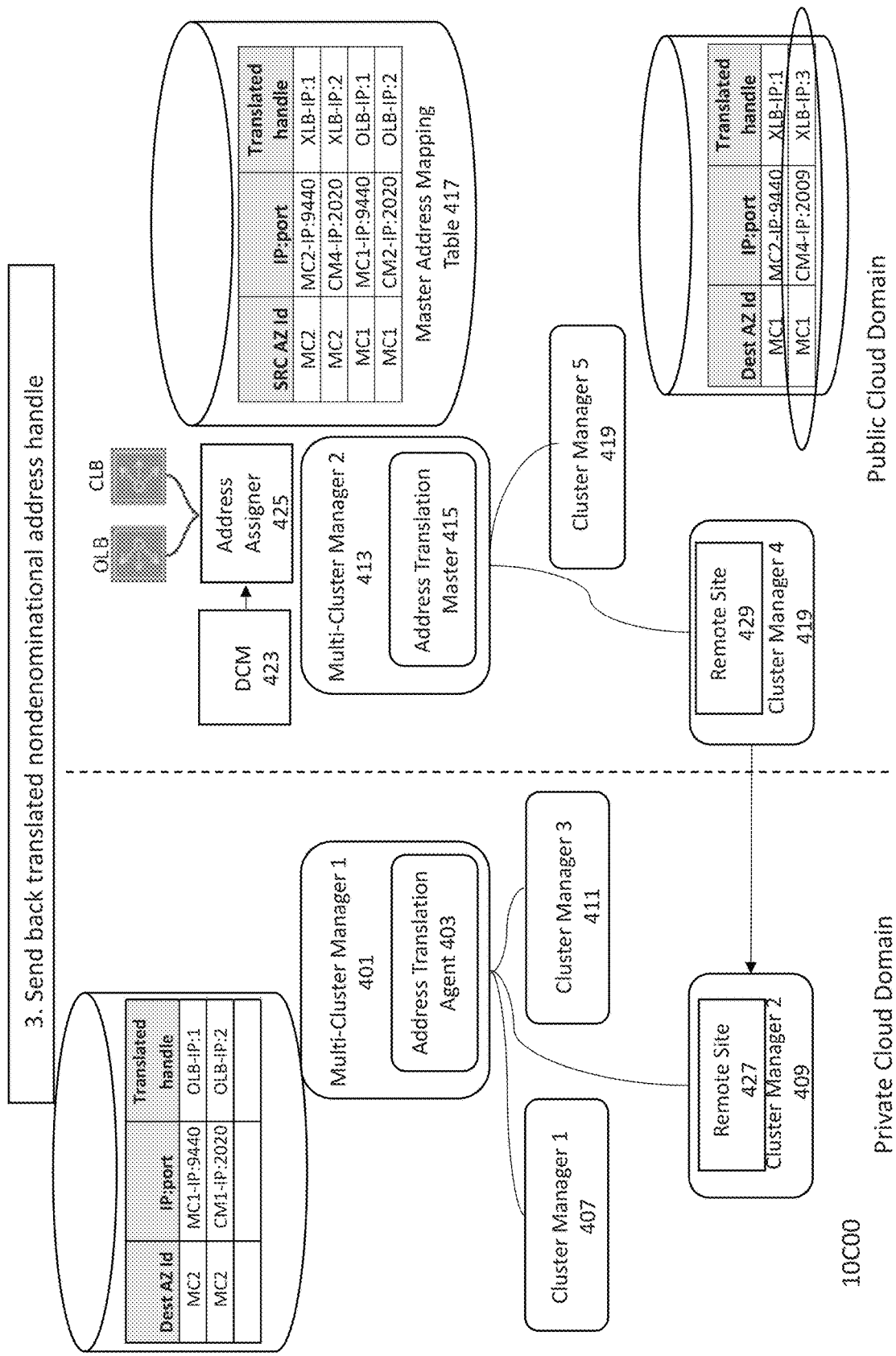
Figure 10D:
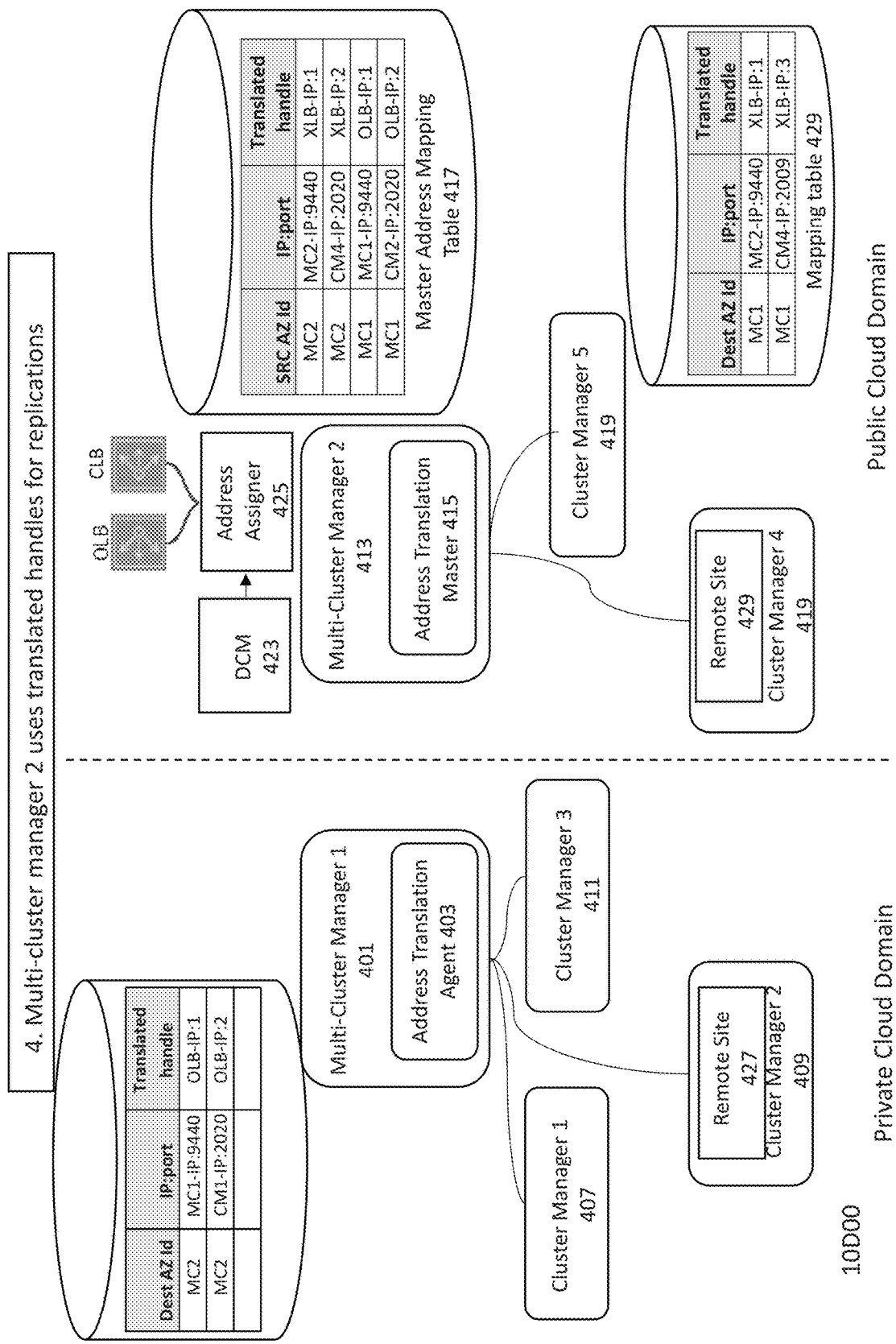

In FIG. 10B, the address translation master 415 on the multi-cluster manager 2 413 will look up the mapping table 429 for the correct translated entry. In some embodiments, the multi-cluster manager 2 413 finds the target cluster manager and will return its translated IP (e.g., XLP-IP:3), as shown in FIG. 10C. As an optional step in some embodiments, the multi-cluster manager 1 401 creates the remote site with CLB-IP:port and requests a translations.

Subsequently, the multi-cluster manager 1 401 sends a request to add remote site to the cluster manager 4 419. The service at the cluster manager 4 419 will then create a remote site with OLB-IP:port.

In FIG. 10C, the remote site 429 on the public cloud domain will send back the translated nondenominational address handle (CLB-IP:3) instead of the raw IP:port address to the remote site 427 on the cluster manager 2 409. Finally, at FIG. 10D, the multi-cluster manager 2 uses the translated handles (CLB-IP:3) for replications.

Therefore, what has been described is an improved method, system, and computer program product for implementing an address translation service that uses nondenominational address handles instead of raw IP addresses between private cloud domain and public cloud domains. The address translation service can be implemented to enable a data-center running in a customer's network to communicate with the public cloud domain data-center over load balancers. In addition, the address translation service ensures that all services that need to communicate across data-centers can be reached over load balancers. As such, to avoid conflicting subnets used by a data center from the private cloud domain and the public cloud domain, services in the public cloud domain use a private cloud load balancer to connect with the services in a private cloud domain. Similarly, a public cloud load balancer is used to connect with services in the private cloud domain.

As stated above, the advantages of enabling a multi-cluster manager in a private cloud network to communicate with a multi-cluster manager in a public cloud network over load balancers rather than raw IP:port addresses is avoiding conflicting subnets used by the two multi-cluster managers. In addition, all the software logic will remain the same except for both the private and public cloud domains returning a translated address. The cloud-side networking also remains hidden from nodes on the private cloud domain. As such, any updates to the public cloud-side network can be managed by configuring the load balancer on the public cloud side.

System Architecture Overview

Additional System Architecture Examples

Figure 11A:
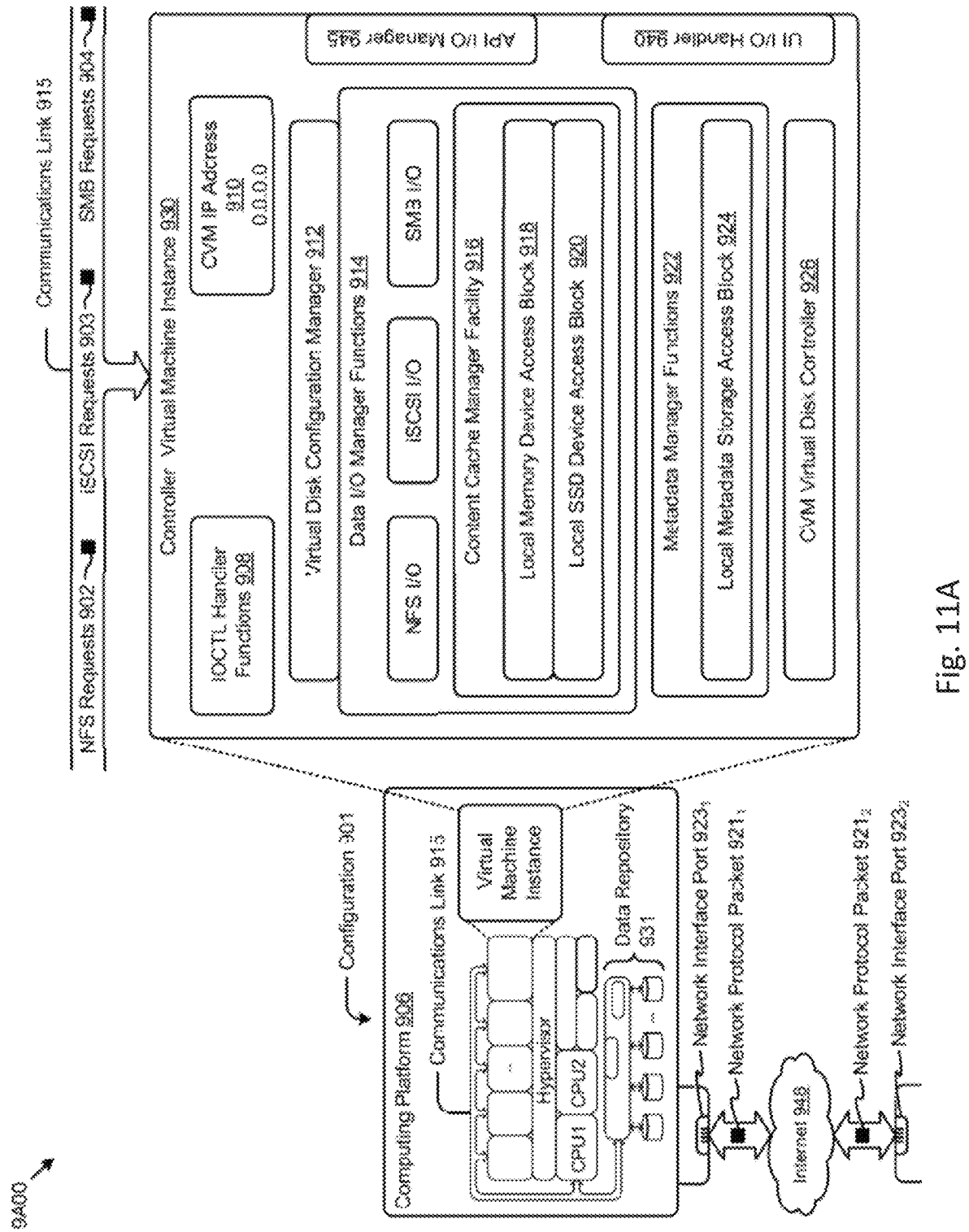
FIG. 11A-B depict virtualized controller architectures comprising collections of interconnected components suitable for implementing embodiments of the present disclosure and/or for sure in the herein-described environment.

FIG. 11A depicts a virtualized controller as implemented by the shown virtual machine architecture 9A00. The virtual machine architecture comprises a collection of interconnected components suitable for implementing embodiments of the present disclosure and/or for use in the herein-described environments. Moreover, the shown virtual machine architecture 9A00 includes a virtual machine instance in a configuration 901 that is further described as pertaining to the controller virtual machine instance 930. A controller virtual machine instance receives block I/O (input/output or IO) storage requests as network file system (NFS) requests in the form of NFS requests 902, and/or internet small computer storage interface (iSCSI) block IO requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output (I/O or IO) can be handled by one or more IO control handler functions (e.g., IOCTL functions 908) that interface to other functions such as data IO manager functions 814 and/or metadata manager functions 922. As shown, the data IO manager functions can include communication with a virtual disk configuration manager 912 and/or can include direct or indirect communication with any of various block IO functions (e.g., NFS IO, iSCSI IO, SMB IO, etc.).

In addition to block IO functions, the configuration 901 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through the shown API IO manager 945.

The communications link 915 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 930 includes a content cache manager facility 916 that accesses storage locations, possibly including local dynamic random access memory (DRAM) (e.g., through the local memory device access block 918) and/or possibly including accesses to local solid state storage (e.g., through local SSD device access block 920).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 931, which in turn can be formatted into any one or more storage areas, and which can comprise parameterized storage accessible by a key (e.g., a filename, a table name, a block address, an offset address, etc.). An external data repository 931 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 924. The external data repository 931 can be configured using a CVM virtual disk controller 926, which can in turn manage any number or any configuration of virtual disks.

Execution of the sequences of instructions to practice certain embodiments of the disclosure are performed by a one or more instances of a software instruction processor, or processing element such as a data processor, or such as a central processing unit (e.g., CPU1, CPU2). According to certain embodiments of the disclosure, two or more instances of a configuration 901 can be coupled by a communications link 915 (e.g., backplane, LAN, PTSN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port $923_1$ and network interface port $923_2$). The configuration 901 can be addressed through one or more network interface ports using an IP address. Any operational element within computing platform 906 can perform sending and receiving operations using any of a range of network protocols, possibly including network protocols that send and receive packets (e.g., network protocol packet $921_1$ and network protocol packet $921_2$).

The computing platform 906 may transmit and receive messages that can be composed of configuration data, and/or any other forms of data and/or instructions organized into a data structure (e.g., communications packets). In some cases, the data structure includes program code instructions (e.g., application code) communicated through Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or results of executing program code can be delivered to a particular user via a download (e.g., a download from the computing platform 906 over the Internet 948 to an access device).

The configuration 901 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments of a module include one or more special-purpose hardware components (e.g., power control, logic, sensors, transducers, etc.). Some embodiments of a module include instructions that are stored in a memory for execution so as to implement algorithms that facilitate operational and/or performance characteristics pertaining to autonomous reimaging of nodes in a multi-node computing cluster. In some embodiments, a module may include one or more state machines and/or combinational logic used to implement or facilitate the operational and/or performance characteristics pertaining to autonomous reimaging of nodes in a multi-node computing cluster.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of autonomous reimaging of nodes in a multi-node computing cluster). Such files or records can be brought into and/or stored in volatile or non-volatile memory.

Figure 11B:
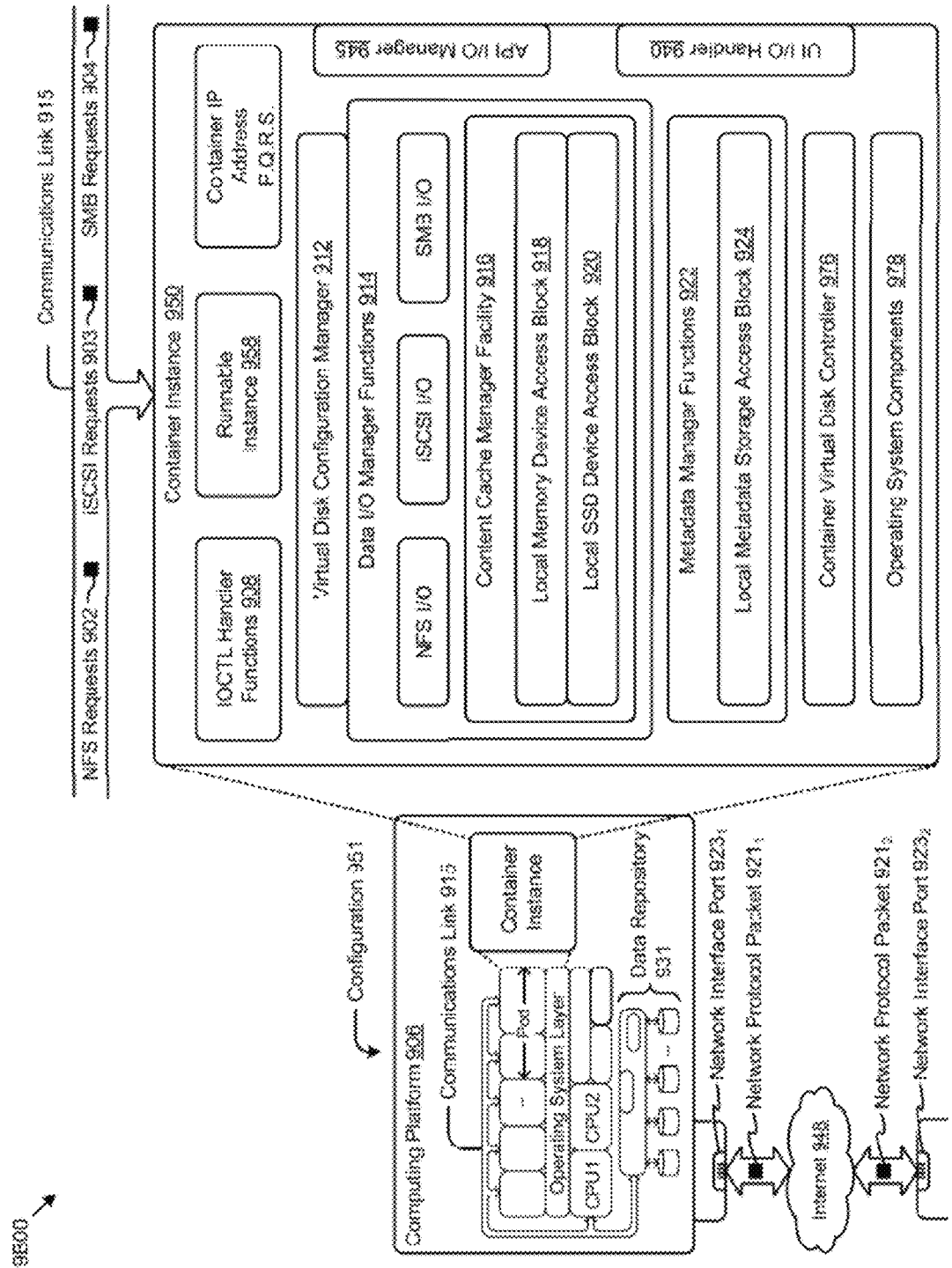

FIG. 11B depicts a virtualized controller implemented by a containerized architecture 9B00. The containerized architecture comprises a collection of interconnected components suitable for implementing embodiments of the present disclosure and/or for use in the herein-described environments. Moreover, the shown containerized architecture 9B00 includes a container instance in a configuration 951 that is further described as pertaining to the container instance 950. The configuration 951 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 950). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance.

In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls-a", etc.). The container might optionally include operating system components 978, however such a separate set of operating system components need not be provided. As an alternative, a container can include a runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 976. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

Figure 12:
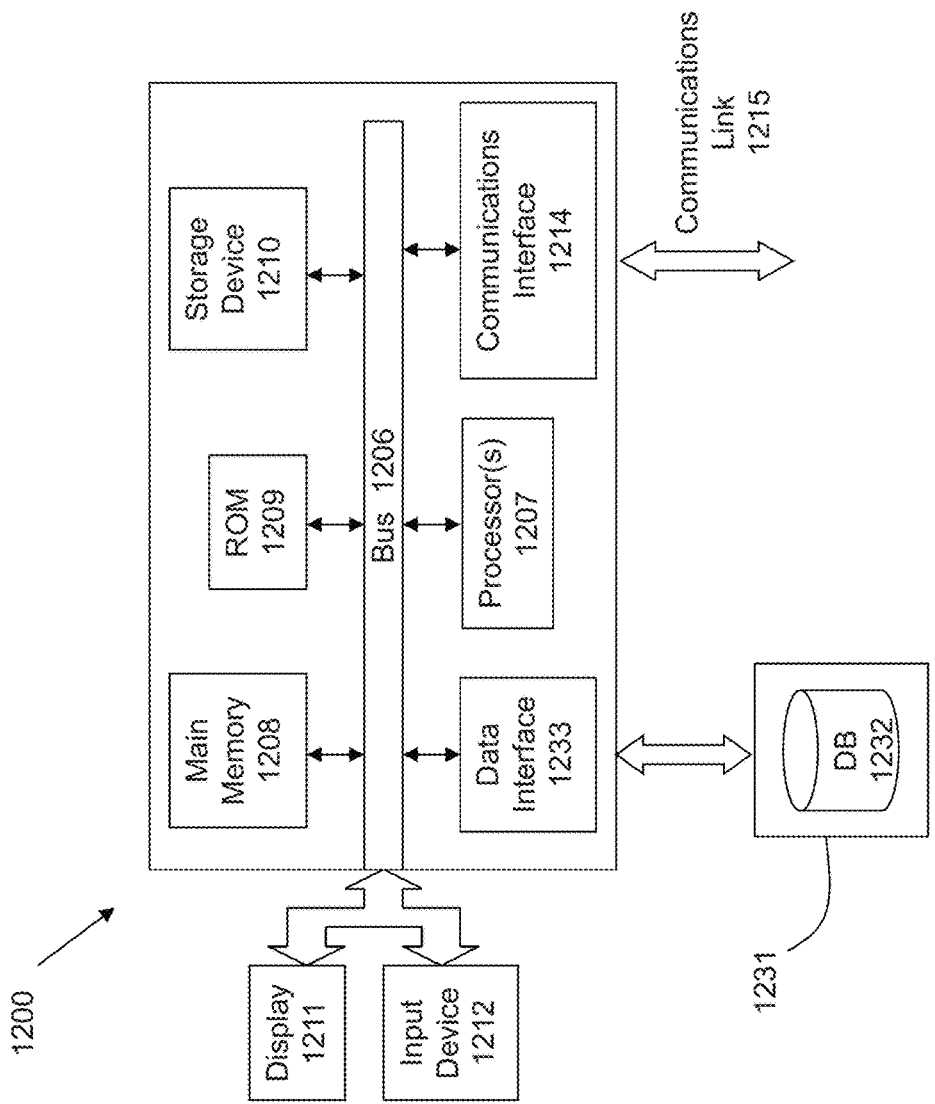
FIG. 12 is a block diagram of a computing system suitable for implementing an embodiment of the present invention.

FIG. 12 is a block diagram of an illustrative computing system 1200 suitable for implementing an embodiment of the present invention. Computer system 1200 includes a bus 1206 or other communication mechanism for communicating information, which interconnects subsystems and devices, such as processor 1207, system memory 1208 (e.g., RAM), static storage device 1209 (e.g., ROM), disk drive 1210 (e.g., magnetic or optical), communication interface 1214 (e.g., modem or Ethernet card), display 1211 (e.g., CRT or LCD), input device 1212 (e.g., keyboard), and cursor control.

According to some embodiments of the invention, computer system 1200 performs specific operations by processor 1207 executing one or more sequences of one or more instructions contained in system memory 1208. Such instructions may be read into system memory 1208 from another computer readable/usable medium, such as static storage device 1209 or disk drive 1210. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1207 for execution. Such a medium may take many forms, including but not limited to, non-volatile media and volatile media. Non-volatile media includes, for example, optical or magnetic disks, such as disk drive 1210. Volatile media includes dynamic memory, such as system memory 1208.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1200. According to other embodiments of the invention, two or more computer systems 1200 coupled by communication link 1210 (e.g., LAN, PTSN, or wireless network) may perform the sequence of instructions required to practice the invention in coordination with one another.

Computer system 1200 may transmit and receive messages, data, and instructions, including program, i.e., application code, through communication link 1215 and communication interface 1214. Received program code may be executed by processor 1207 as it is received, and/or stored in disk drive 1210, or other non-volatile storage for later execution. A database 1232 in a storage medium 1231 may be used to store data accessible by the system 1200.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for implementing address translation services between a private cloud domain and a public cloud domain, the method comprising:
    obtaining at a public cloud domain, a request from a private cloud domain to the public cloud domain, the request being addressed to the public cloud domain using a first nondenominational address handle associated with the public cloud domain, wherein the first nondenominational address handle was previously generated by the public cloud domain and provided to the private cloud domain by the public cloud domain, and the first nondenominational address handle maps to an IP address of the public cloud domain to process the request;
    determining, by the public cloud domain, a response to the request from the private cloud domain; and
    returning a response to the private cloud domain from the public cloud domain, wherein the response is addressed to the private cloud domain using a second nondenominational address handle associated with the private cloud domain, the first and second nondenominational address handles are used instead of a respective IP address for the private cloud domain and the public cloud domain, and the second nondenominational address handle maps to an IP address of the private cloud domain to receive the response.

2. The method of claim 1, further comprising pre-allocating the first nondenominational address handle in a master address mapping table in response to receiving the request from the private cloud domain, wherein the master address mapping table comprises at least one of a source availability zone ID, a destination availability zone ID, an IP address, a port number, or a translated handle.

3. The method of claim 1, further comprising:
    implementing an onboarding process that deploys a multi-cluster manager and a cluster manager in the public cloud domain with an external IP address; and
    implementing an address translation agent on the private cloud domain.

4. The method of claim 1, wherein an address translation agent on the private cloud domain runs in a virtual machine.

5. The method of claim 1, further comprising pairing a first multi-cluster manager from the private cloud domain and a second multi-cluster manager from the public cloud domain to create a multi-cluster connection.

6. The method of claim 1, further comprising:
    identifying an addition or removal of a node in the private cloud domain; and
    updating a master address mapping table in response to identifying the addition or removal of the node.

7. The method of claim 1, further comprising programming a load balancer with different port numbers, wherein the different port numbers correspond to different services.

8. A non-transitory computer readable medium having stored thereon a sequence of instructions which, when stored in memory and executed by a processor causes the processor to perform a set of acts, the set of acts comprising:
    obtaining at a public cloud domain, a request from a private cloud domain to the public cloud domain, the request being addressed to the public cloud domain using a first nondenominational address handle associated with the public cloud domain, wherein the first nondenominational address handle was previously generated by the public cloud domain and provided to the private cloud domain by the public cloud domain, and the first nondenominational address handle maps to an IP address of the public cloud domain to process the request;
    determining, by the public cloud domain, a response to the request from the private cloud domain; and
    returning a response to the private cloud domain from the public cloud domain, wherein the response is addressed to the private cloud domain using a second nondenominational address handle associated with the private cloud domain, the first and second nondenominational address handles are used instead of a respective IP address for the private cloud domain and the public cloud domain, and the second nondenominational address handle maps to an IP address of the private cloud domain to receive the response.

9. The non-transitory computer readable medium of claim 8, wherein an address translation agent on the private cloud domain runs in a virtual machine.

10. The non-transitory computer readable medium of claim 8, wherein the set of acts further comprise pre-allocating the first nondenominational address handle in a master address mapping table in response to receiving the request from the private cloud domain, wherein the master address mapping table comprises at least one of a source availability zone ID, a destination availability zone ID, an IP address, a port number, or a translated handle.

11. The non-transitory computer readable medium of claim 8, wherein the set of acts further comprise:
 implementing an onboarding process that deploys a multi-cluster manager and a cluster manager in the public cloud domain with an external IP address; and
 implementing an address translation agent on the private cloud domain.

12. The non-transitory computer readable medium of claim 8, wherein the set of acts further comprising:
 identifying an addition or removal of a node in the private cloud domain; and
 updating a master address mapping table in response to identifying the addition or removal of the node.

13. The non-transitory computer readable medium of claim 8, wherein the set of acts further comprise pairing a first multi-cluster manager from the private cloud domain and a second multi-cluster manager from the public cloud domain to create a multi-cluster connection.

14. The non-transitory computer readable medium of claim 8, wherein the set of acts further comprise programming a load balancer with different port numbers, wherein the different port numbers correspond to different services.

15. A system comprising:
 a storage medium having stored thereon a sequence of instructions; and
 a processor that executes the sequence of instructions to cause the processor to perform a set of acts, the set of acts comprising:
  obtaining at a public cloud domain, a request from a private cloud domain to the public cloud domain, the request being addressed to the public cloud domain using a first nondenominational address handle associated with the public cloud domain, wherein the first nondenominational address handle was previously generated by the public cloud domain and provided to the private cloud domain by the public cloud domain, and the first nondenominational address handle maps to an IP address of the public cloud domain to process the request;
  determining, by the public cloud domain, a response to the request from the private cloud domain; and
  returning a response to the private cloud domain from the public cloud domain, wherein the response is addressed to the private cloud domain using a second nondenominational address handle associated with the private cloud domain, the first and second nondenominational address handles are used instead of a respective IP address for the private cloud domain and the public cloud domain, and the second nondenominational address handle maps to an IP address of the private cloud domain to receive the response.

16. The system of claim 15, wherein the set of acts further comprise programming a load balancer with different port numbers, wherein the different port numbers correspond to different services.

17. The system of claim 15, wherein the set of acts further comprise pre-allocating the first nondenominational address handle in a master address mapping table in response to receiving the request from the private cloud domain, wherein the master address mapping table comprises at least one of a source availability zone ID, a destination availability zone ID, an IP address, a port number, or a translated handle.

18. The system of claim 15, wherein an address translation agent on the private cloud domain runs in a virtual machine.

19. The system of claim 15, wherein the set of acts further comprise pairing a first multi-cluster manager from the private cloud domain and a second multi-cluster manager from the public cloud domain to create a multi-cluster connection.

20. The system of claim 15, wherein the set of acts further comprise:
 implementing an onboarding process that deploys a multi-cluster manager and a cluster manager in the public cloud domain with an external IP address; and
 implementing an address translation agent on the private cloud domain.

21. The system of claim 15, wherein the set of acts further comprising:
 identifying an addition or removal of a node in the private cloud domain; and
 updating a master address mapping table in response to identifying the addition or removal of the node.

22. A non-transitory computer readable medium having stored thereon a sequence of instructions which, when stored in memory and executed by a processor causes the processor to perform a set of acts, the set of acts comprising:
 associating a first address handle with a public cloud domain responder and a second address handle with a private cloud domain requester, wherein the first and second address handles correspond one or more IP addresses of one or more workload placement entities between the private cloud domain requester and the public cloud domain responder, wherein the first address handle was previously generated by the public cloud domain and is provided to the private cloud domain by the public cloud domain;
 using the first address handle for implementing a first communication sent from the private cloud domain requester to the public cloud domain responder, wherein the first communication is sent to the one or more workload placement entities and then directed to a first IP address associated with the public cloud domain responder, and the first address handle maps to the first IP address associated with the public cloud domain responder; and
 using the second address handle for implementing a second communication sent from the public cloud domain responder to the private cloud domain requester, wherein the second communication is sent to the one or more workload placement entities and then directed to a second IP address associated with the private cloud domain requester, and the second address handle maps to the second IP address associated with the private cloud domain requester.

23. The non-transitory computer readable medium of claim 22, wherein the one or more workload placement entities comprise load balancers and the set of acts further comprise programming a load balancer with different port numbers, wherein the different port numbers correspond to different services.

24. The non-transitory computer readable medium of claim 22, wherein the set of acts further comprise pre-allocating the first nondenominational address handle in a master address mapping table at the public cloud domain responder in response to receiving a request from the private cloud domain requester, wherein the master address mapping table comprises at least one of a source availability zone ID, a destination availability zone ID, an IP address, a port number, or a translated handle.

25. The non-transitory computer readable medium of claim 22, wherein the set of acts further comprise pairing a first multi-cluster manager from the private cloud domain requester and a second multi-cluster manager from the public cloud domain responder to create a multi-cluster connection.

26. The non-transitory computer readable medium of claim 22, wherein an address translation agent on the private cloud domain requester runs in a virtual machine.

* * * * *